United States Patent
Simpson et al.

(10) Patent No.: US 7,681,835 B2
(45) Date of Patent: Mar. 23, 2010

(54) SINGLE PIECE CO-CURE COMPOSITE WING

(75) Inventors: Craig B. Simpson, Mapleton, UT (US);
Larry J. Ashton, Mapleton, UT (US);
Mike G. Allman, Spanish Fork, UT (US); Steven T. Tuttle, Springville, UT (US)

(73) Assignee: Rocky Mountain Composites, Inc., Spanish Fork, UT (US)

( * ) Notice: Subject to any disclaimer, the term of this patent is extended or adjusted under 35 U.S.C. 154(b) by 1216 days.

(21) Appl. No.: 11/234,807

(22) Filed: Sep. 23, 2005

(65) Prior Publication Data

US 2006/0249626 A1   Nov. 9, 2006

Related U.S. Application Data

(60) Continuation-in-part of application No. 10/726,970, filed on Dec. 3, 2003, now Pat. No. 7,445,744, which is a division of application No. 10/175,722, filed on Jun. 20, 2002, now Pat. No. 6,889,937, which is a continuation-in-part of application No. 09/443,227, filed on Nov. 18, 1999, now Pat. No. 6,482,497.

(51) Int. Cl.
   *B64C 1/00* (2006.01)
(52) U.S. Cl. ............... 244/123.3; 244/123.14; 428/111; 428/113; 428/172
(58) Field of Classification Search ............. 244/123.1, 244/123.3, 123.14, 123.7; 428/111, 113, 428/114, 172
See application file for complete search history.

(56) References Cited

U.S. PATENT DOCUMENTS

| 1,814,556 A | 7/1931 | Jewett, Jr. |
| 3,764,641 A | 10/1973 | Ash |

(Continued)

FOREIGN PATENT DOCUMENTS

| DE | 37 07 634 C1 | 7/1988 |

(Continued)

OTHER PUBLICATIONS

Japanese Patent Abstract No. 07088845; Publication Date Apr. 4, 1995, p. 1, Applicant Toyota Motor Corp.

(Continued)

*Primary Examiner*—J. Woodrow Eldred
(74) *Attorney, Agent, or Firm*—Craig Metcalf; Kirton & McConkie

(57) ABSTRACT

A single piece co-cured composite wing is disclosed. The wing has a flying surface and structural members. In one embodiment the structural members may be a plurality of spars. The spars may have various shapes to increase the buckling strength. The spars may be wave shaped, such as a sinusoidal shape. The flying surface and the structural members are co-cured in order to form a single piece, integral wing structure. A process for manufacturing a single piece co-cured wing is also disclosed. The process may include laying out composite sheets for the flying surface of the wing. Then, the composite material of the spars is arranged around a plurality of pressurizable forms. Finally, the composite material is cured in a clamshell frame. A single piece co-cured composite structure is also disclosed that includes an outer skin, and inner skin, a frame, and a stringer.

35 Claims, 17 Drawing Sheets

U.S. PATENT DOCUMENTS

| | | | |
|---|---|---|---|
| 4,084,029 A | 4/1978 | Johnson et al. | |
| 4,126,659 A | 11/1978 | Blad | |
| 4,198,018 A | 4/1980 | Brault | |
| 4,357,193 A | 11/1982 | McGann et al. | |
| 4,445,951 A | 5/1984 | Lind et al. | |
| 4,622,091 A | 11/1986 | Letterman | |
| 4,624,874 A | 11/1986 | Schutze | |
| 4,681,724 A | 7/1987 | Faiz et al. | |
| 4,760,493 A | 7/1988 | Pearson | |
| 4,808,362 A | 2/1989 | Freeman | |
| 4,938,824 A | 7/1990 | Youngkeit | |
| 5,106,568 A | 4/1992 | Honka | |
| 5,170,967 A | 12/1992 | Hamamoto et al. | |
| 5,242,523 A | 9/1993 | Willden et al. | |
| 5,266,249 A | 11/1993 | Grimes, III et al. | |
| 5,332,178 A | 7/1994 | Williams | |
| 5,435,504 A | 7/1995 | Inoue et al. | |
| 5,496,002 A | 3/1996 | Schütze | |
| 5,534,203 A | 7/1996 | Nelson et al. | |
| 5,641,366 A | 6/1997 | Hohman | |
| 5,683,646 A | 11/1997 | Reiling, Jr. | |
| 5,721,034 A | 2/1998 | Seemann, III et al. | |
| 5,848,765 A * | 12/1998 | Gillespie | 244/124 |
| 5,875,732 A | 3/1999 | Chapman et al. | |
| 6,179,945 B1 | 1/2001 | Greenwood et al. | |
| 6,190,484 B1 | 2/2001 | Appa | |
| 6,217,000 B1 * | 4/2001 | Younie et al. | 249/184 |
| 6,234,423 B1 | 5/2001 | Hirahara et al. | |
| 6,237,873 B1 | 5/2001 | Amaoka et al. | |
| 6,458,309 B1 | 10/2002 | Allen et al. | |
| 6,482,497 B1 * | 11/2002 | Kay et al. | 428/111 |
| 6,510,961 B1 | 1/2003 | Head et al. | |
| 6,513,757 B1 | 2/2003 | Amaoka et al. | |

FOREIGN PATENT DOCUMENTS

| | | |
|---|---|---|
| DE | 198 36 629 C1 | 10/1999 |
| EP | 0 408 161 | 1/1991 |
| EP | 1 070 661 A2 | 1/2001 |
| EP | 1 134 069 A1 | 9/2001 |
| FR | 1 085 142 | 1/1955 |
| JP | 2000-6893 A | 7/2001 |
| WO | WO-98/32589 | 7/1998 |
| WO | WO 99/32273 | 1/1999 |
| WO | WO-99/04952 | 2/1999 |

OTHER PUBLICATIONS

Niu, Michael C. Y., "Airframe Structural Design," ISBN 4-9980838-1-3 C2053, pp. 1-3, 260, 280-282, 284-285, 289-292, 392, 520-521, 538, 563-565, 2000.

Strong, A. Brent, "Filament Winding of The Beech Starship Airplane Fuselage," Case Study 19.1, Plastics, Materials and Processing, Second Edition, Prentice Hall, 2000, pp. 674-677.

* cited by examiner

SINGLE PIECE CO-CURE COMPOSITE WING

CROSS-REFERENCED RELATED APPLICATIONS

This application is a continuation-in-part of prior application Ser. No. 10/726,970, filed Dec. 3, 2003 now U.S. Pat. No. 7,445,744, which is a divisional application of application Ser. No. 10/175,722 filed Jun. 20, 2002, now issued as U.S. Pat. No. 6,889,937, which is a continuation-in-part of application Ser. No. 09/443,227 filed Nov. 18, 1999, now issued as U.S. Pat. No. 6,482,497 to Craig B. Simpson, Mike G. Allman, Steven T. Tuttle, and Larry J. Ashton.

BACKGROUND OF THE INVENTION

1. Field of the Invention

The present invention relates to a wing structure. More particularly, the present invention relates to a single piece composite wing structure.

2. Technical Background

The design of aircraft wings poses difficult design problems. Multiple factors must be balanced in order to design an effective wing. One consideration is the shape of the wing. The wing must have the proper airfoil-shape in order to create the desired lift. The flying surface of the wing must be such that it does not disturb the aerodynamic flow of air. The wing must also have enough strength to lift the weight of the aircraft fuselage. Furthermore, many aircraft wings also serve as a fuel tank, which adds complexity to the design of the wing. Compounding the difficult design parameters is the desire to make the wing as light-weight as possible.

Aircraft wings are commonly comprised of a flying surface and various structural members. The structural members may include spars and ribs that intersect with one another within the wing. Together, the spars and ribs transfer the lift from the flying surface to the fuselage of the aircraft. The spars and ribs are often made of a machined metal, such as aluminum, that is manufactured to precise tolerances and load requirements. The flying surface of the wing may also be a metal that is attached to the structural members to define the airfoil of the wing.

Attaching the flying surface to the structural members typically includes creating thousands of holes in the flying surface and the structural members. Thousands of rivets are then needed and are often manually placed in each hole. The process of creating thousands of holes in the wing and inserting thousands of rivets in the holes substantially increases the manufacturing cost of the wing. Additionally each hole in the wing weakens the flying surface and the structural members. Furthermore, by increasing the number of parts for a wing, the chances of introducing a defective part are correspondingly increased. Another drawback to current wing designs is the weight increase caused by the numerous fasteners and bulky metal structural members.

Recently, composite materials have been introduced as a desirable material for aircraft structures. Composite materials are often comprised of strands of fibers, typically carbon fiber, mixed with a resin. The fibers are often wound or woven into a sheet of material and then impregnated with a resin. The composite material is then formed into the desired shape and cured until properly hardened. Composite materials have the advantage of being extremely light weight and having high strength. Additionally, composite structures are molded into desired shapes and configurations.

Unfortunately, there are several drawbacks to composite materials. First, composite materials are very expensive. This high cost is a result of the cost of the raw materials as well as the cost of manufacturing the composite parts from the raw material. The high manufacturing costs of the composite structures combined with the price of the expensive raw materials, often makes the use of composite materials cost prohibitive.

Another drawback to composite materials is the assembling of the composite material. Different considerations must be made for assembling composite materials than with other materials. Placing holes in composite materials for attachment of fasteners severs the strands of fibers within the material and creates weak points within the material. While forming holes in the composite material by displacing the strands of the uncured fiber prevents severing of the fibers, this process is time-consuming and often impractical.

Another alternative for assembling composite materials is the use of high strength epoxies. Epoxies have the advantage of limiting the number of manufacturing steps. However, the distribution of the epoxy and the placement of the parts together can require expensive machines and numerous jigs.

Regardless of whether composite materials or traditional metals are used in the wing, an inspection of each fastener attachment must be performed. Obviously, the more fasteners and attachments in the wing, the more inspection will be required. Not only must these fasteners and attachments be inspected after manufacturing, they must also be periodically inspected throughout the life of the aircraft. Thus, the construction of the wing has implications not only on the initial cost of the wing, but also implications on the maintenance costs through the life of the wing.

Therefore, there is a need in the art for a wing that limits the number of fasteners present in the wing. There is also a need for a wing that may be assembled with limited assembly procedures. There is a further need for a wing that is light weight. A need also exists for a wing that limits the extent of inspection required in post manufacturing and during maintenance. A need further exists for a low-cost composite wing. Such a wing and method for manufacturing the wing are disclosed and claimed herein.

BRIEF SUMMARY OF THE INVENTION

The apparatus and method of the present invention have been developed in response to the present state-of-the-art, and, in particular, in response to problems and needs in the art that have not yet been fully resolved by currently available wing structures. Thus, it is an overall objective of the present invention to provide a single piece co-cured composite wing.

The wing is comprised of a composite flying surface and composite structural members. The flying surface and composite structural members are co-cured to form a single piece composite wing. Various structural members may be incorporated into the wing. For example the structural members may comprise a spar, rib, or other such members.

In one embodiment, the spars may be I-beams. The I-beams may be comprised of two C-shaped beams placed back to back. Other embodiments of the spar may have a J-shaped cross section or C-shaped cross section. The spar may be comprised of a spar cap and a webbing. The filament bands that comprise the spar cap and webbing may be oriented according to loads placed upon individual members.

Furthermore, the spars may be wave shaped. The waves may be sinusoidal shaped or have a step wave shape. The amplitude and frequency of the waves in the spars may vary from spar to spar as well as along the length of a single spar.

The spars may also have various flat sections or sections with different geometries in order to receive different attachments and structures, such as an intersecting slosh gate.

The flying surface of the wing may comprise an upper flying surface and a lower flying surface. The upper flying surface and the lower flying surface may be comprised of two separate sheets of composite material, or alternatively the two flying surfaces may be comprised of a single sheet of composite material. Other embodiments may use multiple sheets of composite material in order to form the flying surfaces. The various sheets of composite material for the flying surfaces may have selected intersection points, such as a position below the leading edge of the wing.

The single piece co-cured composite wing may be manufactured through various methods. In one method, the composite wing may be made by first, laying a piece of composite material on a first clam shell frame for the first flying surface. Then, a plurality of pressurizable forms may be aligned to define the structural members of the wing, where the composite material is selectively positioned between the pressurizable forms. Next, the composite material for the upper flying surface is placed over the pressurizable forms and the composite material for the lower flying surface. Once the composite materials and pressurizable forms are configured, the clamshell frames are closed and the composite material is cured.

In one embodiment of the process, the pressurizable forms may be pressurized while the composite material is cured. The pressurization of the forms forces the composite material into a specific shape defined by the clamshell frames and forms. Additionally, the pressurizable forms may have a foam core surrounded by a membrane. The foam cores may also shrink during curing, such that the foam cores may be removed and a membrane peeled from within the composite wing. Another method for manufacturing a single piece co-cured structure that includes a skin, a frame, and a stringer that are interwoven together is also disclosed. The skin of the single piece co-cured structure includes an inner skin and an outer skin. The method includes the steps of forming the inner skin of composite material on a mandrel comprising a frame provision and a stringer provision, cutting the inner skin along the frame provision, and disposing a frame shear-ply of composite material within the frame provision to form the frame, the frame shear-ply covering a portion of the inner skin. The method may also include the step of cutting the frame shear-ply along the stringer provision. The method includes the steps of cutting the inner skin along the stringer provision, disposing a stringer shear-ply of composite material within the stringer provision to form the stringer, the stringer shear-ply covering a portion of the inner skin, and cutting the stringer shear-ply along the stringer provision.

Additionally, the method may include disposing frame core composite material within the frame provision so that the frame shear-ply material partially surrounds the frame core composite material. The frame core composite material including unidirectional fibers aligned with the length of the frame provision. Similarly the method may include the step of disposing stringer core composite material within stringer provision so that the stringer shear-ply material partially surrounds the stringer core composite material. The stringer core composite material may include unidirectional fibers aligned with the length of the stringer provision. The frame core composite material may be interwoven with the stringer core composite material.

To form some frame cross sectional shapes, the method may include the steps of disposing an insert tool, which includes an insert stringer provision to facilitate interweaving the stringer with the frame, within the frame provision of the mandrel and disposing an inner support skin on the insert tool to help form the frame. Similarly, the method may include the steps of disposing an insert tool within the stringer provision and disposing intersection pads at an intersection of the frame provision with the stringer provision on the mandrel. In some configurations, the insert tool disposed within the frame provision and the insert tool disposed within the stringer provision may overlap.

Finally the method includes the steps of forming the outer skin of composite material over the inner skin, frame shear-ply, and stringer shear-ply and co-curing the skin, the frame, and the stringer as a single piece composite structure, removing the mandrel from the single piece co-cured composite structure, and removing all insert tools from the frame provisions and stringer provisions of the mandrel.

An embodiment of a single piece co-cured composite structure that may be made by this method may include a composite skin having an inner skin and an outer skin, a composite frame, and a composite stringer. This structure may be a fuselage for aircraft or other structure that is enhanced by lighter weight, superior strength and durability over prior art structures. The frame and the stringer extend inward from the outer skin. The outer skin may be a flying surface and help to provide lift to the structure as it moves through the air. Additionally, the outer skin may be shaped to lessen the drag from air passing over the outer skin.

The frame and stringer may include a core of fibers. The fibers of the core of the frame may include unidirectional fibers aligned along the length of the frame. The composite stringer extends inward from the outer skin and may also include a core of fibers. The fibers of the core of the stringer may include unidirectional fibers aligned along the length of the stringer.

Additionally, the fibers of the core of the frame may be interwoven with the fibers of the core of the stringer. Furthermore, the fibers of the frame and stringer may be woven together in successive layers. The frame may also include a frame base that may be interwoven with the skin. The frame may also extend through the inner skin. Similarly, the stringer may extend through the inner skin and include a stringer base. The stringer base may be interwoven with the skin.

The frame may also include a frame shear-ply that extends partially around the core of the frame. The frame shear-ply may be one or more layers of composite material. The fibers of the frame shear-ply may include fibers orientated about 45° relative to the length of the frame. The stringer may also include a stringer shear-ply that extends partially around the core of the stringer. The stringer shear-ply may be one or more layers of composite material. The fibers of the stringer shear-ply may include fibers orientated about 45° relative to the length of the stringer. The skin, the frame, and the stringer are co-cured to form a single piece composite structure.

An alternative configuration of a single piece co-cured composite structure according to the invention may include a composite skin having an inner skin and an outer skin, a composite frame extending inward from the outer skin, and a composite stringer extending inward from the outer skin. The fibers of the stringer may be interwoven with the fibers of the frame. Additionally, the fibers of the frame and the fibers of the stringer are interwoven with the skin. The skin, the frame, and the stringer are co-cured to form a single piece composite structure.

The frame may include a frame shear-ply. The frame shear-ply is one or more layers of composite material. In some configurations the frame shear-ply may include fibers orientated about 45° relative to the length of the frame. The frame may also include fibers aligned along the length of the frame.

The stringer may include a stringer shear-ply composed of one or more layers of composite material. The fibers of the stringer shear-ply may be orientated about 45° relative to the length of the stringer. The stringer may also include fibers aligned along the length of the stringer.

An additional configuration of a co-cured composite wing structure according to the invention includes a composite flying surface having an inner skin and an outer skin and a plurality of spars that extending lengthwise along the flying surface to structurally support the flying surface. The spars extend inward from the outer skin through the inner skin and are interwoven with the flying surface to provide a strong skin/spar interface. Additionally, the spars are integrally formed with the flying surface via co-curing of the spars and flying surface.

Each spar of the plurality of spars includes a spar cap and a webbing. The spar cap allows the spar to be interwoven with the flying surface. The spar cap extends parallel to the outer skin and between the outer skin and the inner skin. The inner skin may also partially extend onto the webbing of the spar to better secure the spar to the skin.

Each spar may have a different cross sectional shape. In one configuration, one spar may include two substantially C-shaped composite sections positioned in opposing orientations to form an I-shaped cross sectional shape. Alternatively, a spar may have a C-shaped or a J-shaped cross sectional shape. Additionally, a spar may be sinusoidal shaped along the length of the flying surface. The webbing of a spar may have fibers orientated about 45° relative to the length of the spar.

The co-cured composite wing structure may be a complete wing or a complete wing span. The complete wing span may have a spar that is continuous through the complete wing span. The composite wing structure may also be one of an aileron, a wing tip, a horizontal stabilizer, a vertical stabilizer, a flap, an elevator and a canard.

Interwoven single piece co-cured composite structures provide superior performance to structures that include pieces that are adhered together by adhesives or attached by cured resin only. For example, an interwoven skin and frame may have an interface strength three times as great as the interface strength between a frame and skin that is attached by adhesives or resin alone. Additionally, the shear-ply material of the frames and stringers provide additional protection to core fibers so that the interwoven single piece composite structures may be able to function for longer periods of time.

These and other features, and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The preferred embodiments of the invention are now described with reference to FIGS. 1-9C, where like reference numbers indicate identical or functionally similar elements. The members of the present invention, as generally described and illustrated in the figures, may be implemented in a wide variety of configurations. Thus, the following more detailed description of the embodiments of the system and method of the present invention, as represented in the Figures, is not intended to limit the scope of the invention as claimed, but is merely representative of presently preferred embodiments of the invention.

Figure 1:
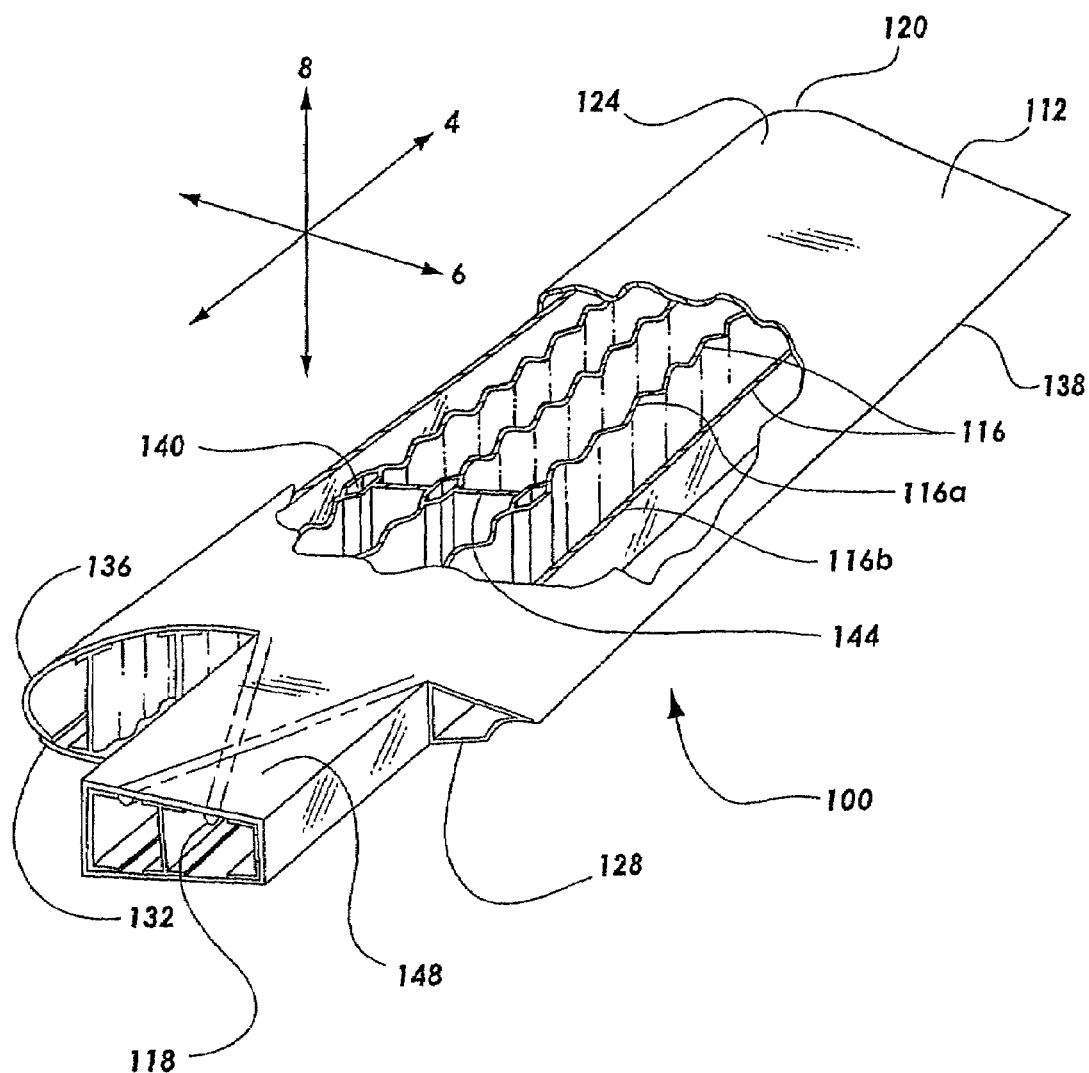
FIG. 1 is a perspective view of the wing having a cutaway section.

The present invention provides for a single piece co-cured composite wing structure. Referring to FIG. 1, a single piece co-cured wing 100 having a composite flying surface 112 and a plurality of composite structural members is illustrated. The composite structural members may have various embodiments for maintaining the general shape of the flying surface 112 and allowing the lift of the wing structure 100 to be transferred to a fuselage (not shown).

The wing structure 100 may include the various components of the wing, such as the ailerons, wing tips, horizontal stabilizers, vertical stabilizers, flaps, elevators, canards and the like. These wing structures will have a flying surface and structural members that are co-cured into a single piece. In some instances, the structural members may include thickened sections of the flying surface to provide structural support. References to a wing 100 or wing structure herein shall include the individual attachable components of a wing 100, such as those listed above and not simply the main portion of the wing. It should be noted that the various components need not be co-cured to each other, but rather the individual components are single piece co-cured structures.

Additionally, recitation of a wing 100 and the methods for creating a wing 100, includes a complete wing span or tip-to-tip wing. Implementing a single piece co-cured right and left wing structure can reduce the assembly steps of attaching a right wing and a left wing to each other and to attach both single wings to a fuselage. Thus, references herein to a wing include a full tip-to-tip wing span, a single wing, and various wing structures.

In the embodiment illustrated and FIG. 1, the structural members are comprised of a plurality of wing spars 116. However, structural members, such as ribs and stiffeners, may also be incorporated into the wing 100. Generally, the wing spars 116 are positioned along the length of the wing 100, the length being in the lateral direction 4. The spars 116 provide structural support for the wing 100 in order to receive the large loads placed upon the wing 100 during flight. The loads on the wing tip 120 will tend to cause the wing 100 to bend and fail. However, the presence of the spars 116 will strengthen the wing 100 sufficient for flight.

The wing 100 may also incorporate ribs (not shown) situated generally perpendicularly to the spars 116. The ribs may have a shape that is generally similar to the cross-sectional shape of the wing 100 in the transverse direction 6. Similar to the spars 116, the ribs will provide structural support for the wing 100 during flight. The ribs may be placed completely along the transverse 6 width of the wing 100, or alternatively, the ribs may only be positioned between selective spars 116.

Other structural members that may be incorporated in the wing 100 include stiffeners 118 positioned on the inside of the flying surface 112. The stiffeners 118 may be small supported structures that are attached to or integrally formed into the interior of the flying surface 112. Furthermore, the stiffeners 118 may incorporate rigid materials embedded within the composite flying surface 112.

The wing 100 has the advantage of combining the flying surfaces 112 and the structural members, such as the spars 116, into a single piece co-cured composite wing 100. Co-curing entails simultaneously curing together the composite material of the flying surfaces 112 and the structural members. As the flying surfaces 112 and the structural members are co-cured, the curing of the resin impregnated composite material bonds the flying surfaces 112 to the structural members. By co-curing the wing 100, the use of fasteners to attach the flying surfaces 112 to the structural members may be avoided. Additionally, fasteners that are often required to attach the structural members to each other may be eliminated.

In a typical non-composite, or non-co-cured wing, multiple fasteners, such as rivets, are used to attach the flying surfaces to the structural members. These fasteners add significant costs to the wing because of the actual cost of the fasteners as well as the large amount of assembly time in attaching the fasteners. Typically, thousands of holes must be placed within the flying surfaces to provide attachment to the structural members. Each hole in the flying surface decreases the strength of the flying surface and creates an additional component to be inspected to verify safety. Many other advantages exist by eliminating fasteners. Thus, a single piece co-cured composite wing 100 reduces the assembly cost and part count as well as increases the integrity of the wing 100.

The composite material for the flying surface 112 may be a broad sheet of composite material. The composite material may be wound, woven, or otherwise formed. It may be advantageous for the flying surface 112 to be made of as few sheets of composite material as possible. By using generally broad pieces of composite material for the flying surface 112, the number of seams can be limited. Limiting the number of seams in the flying surface 112 will create a stronger structure by providing fewer locations for separation of material. Furthermore, a generally seamless flying surface 112 may have better aerodynamic characteristics and require less assembly time.

The flying surface 112 of the wing 100 may be generally described as an upper flying surface 124 and a lower flying surface 128. The upper flying surface 124 and the lower flying surface 128 may be comprised of a single sheet of composite material that wraps around the wing 100 and is connected at an intersection location 132. The intersection location 132 is essentially a seam where the two ends of the single piece of composite material meet. It may be preferable for the intersection location 132 to be in a location of low stress and in a location which does not affect the aerodynamics of the wing 100. One such location is shown in FIG. 1 below the leading edge 136 of the wing on the lower flying surface 128.

Alternatively, the upper flying surface 124 and the lower flying surface 128 may be two separate sheets of composite material. Each sheet may substantially cover one of the upper flying surface 124 and the lower flying surface 128. However, in an alternative embodiment one of the composite sheets may span between the upper flying surface 124 and the lower flying surface 128, in order to avoid a seam in a high stress location, such as the leading edge 136. Yet other flying surface 124 configurations may incorporate multiple sheets of composite material.

Furthermore, the flying surface 112 may be constructed of composite material that is generally solid, with few openings. Often composite materials have openings between the individual filament bands. These openings must be sealed to create the completed flying surface 112. This may entail filling the openings within additional material or covering the entire flying surface 112 with a layer of solid material. Either option creates additional assembly costs and adds weight to the wing 100. While a generally solid and light weight composite material may be preferable for the flying surface 112, one having ordinary skill in the art will recognize that many different materials may be employed to create a single piece co-cured wing 100.

In one embodiment, the composite material of the flying surface 112, when uncured, has characteristics similar to that of cloth. The cloth-like characteristics allow the composite material to be formed into the shape of the structural members or the flying surfaces 112. Once the composite material is cured, it becomes generally rigid with characteristics that may be similar to a sheet of metal or plastic.

The flying surface 112 cooperates with the structural members to create a high strength wing 100. In one embodiment, the structural members are comprised of spars 116 situated in a lateral orientation 4. The spars 116 are configured to maintain the shape of the wing 100 and transfer the lift on the flying surface 112 to the fuselage (not shown). The spars 116 may incorporate various shapes in order to provide a sufficient amount of strength to the wing 100.

As illustrated in FIG. 1, some of the spars 116a have a wave-shaped lateral 4 dimension, while others spars 116b are generally straight. While a wing 100 may use only wave-shaped spars 116a or straits spars 116b, a combination of differing shaped spars 116 may allow for maximum strength and minimum weight. Generally, a wave-shaped spar 116a will have a higher strength than a straight spar 116b of the same thickness and height. The wave-shaped spars 116a will also be heavier than the straight spars 116b, due to the added material.

The waves will increase the buckling strength in the wave-shaped spars 116a. The increased strength can be understood by viewing the wave-shaped spar 116a as a series of small beam segments attached end-to-end where adjacent beam segments are oriented in different directions. As one beam segment approaches a bending limits, that bending force may be transferred to a sheer force in the adjacent beam segment. Such an interaction will occur throughout the wave-shaped spar 116a, where adjacent beam segments support one another.

In the embodiment illustrated in FIG. 1, the waves in the wave-shaped spars 116 are generally sinusoidal shaped. However, other wave-shaped patterns may be incorporated into the spars 116. For example, the spars 116 may be a step wave shape with generally angular bends along the length of the spar 116. Other variations of the wave-shaped spars 116a may vary the amplitude and frequency along the length of the spar 116a or vary from spar 116a to spar 116a within a single wing 100.

A wave-shaped spar 116a may be designed such that the amplitude and frequency of the waves in the spar 116a correspond to various load requirements for different sections of the wing 100. For example, in locations of the wing 100 with small loads, the spar 116a may have waves with small amplitudes and frequencies. Other sections of the same spar 116a may have waves with larger amplitudes and frequencies to correspond to larger loads. By varying the shape of a spar 116a along its length, a spar 116a may be designed for an optimal strength with a minimal weight.

The spars 116 may also have various other geometries in order to receive other structural and non-structural members. For example, the spars 116 illustrated in FIG. 1, have mounting structures 140 along the length of the spars 116. In this embodiment, the mounting structures 140 have flat surfaces to allow for a perpendicular attachment of a structure. For example, the intersecting structures may be slosh gates 144.

The slosh gates 144 are present to prevent fuel from freely flowing within the wing 100. In many aircraft applications, the wing 100 serves as a fuel reservoir for the aircraft. In the wing 100 shown, the fuel may be placed within the two channels defined by the three wave-shaped spars 116a. During operation, the aircraft will make various turns and maneuvers which will cause the liquid fuel to slosh from one side of the wing 100 to the other. The slosh gates 144 are provided to prevent the rapid flow of fuel within the wing 100. The slosh gates 144 may or may not be structural. Similarly, the slosh gates 144 may be part of a rib or other structural member.

The spars 116 may have openings to allow fluid communication between the channels defined by the spars 116. The opening may allow for fuel to flow between channels defined by the spars 116. The spars 116 may also include various mounting structures along the spars 116 to allow attachments of wiring, hydraulic systems, or mechanical elements of the wing 100.

A single spar 116 may also be a combination of wave-shaped sections as well as straight sections. For example, the spars 116 that define the wing box 148 may be wave-shaped in the main sections of the wing 100 and have a straight section where the spar 116 becomes part of the wing box 148. Other spars 116 may terminate before the wing box 148, such that they are only present in the main section of the wing 100. Different spars 116 may have other combinations of wave-shaped and straight sections along a single spar 116. In yet other embodiment, spars 116 may run between a right wing and a left wing, creating a secure attachment between the two wings.

Figure 2:
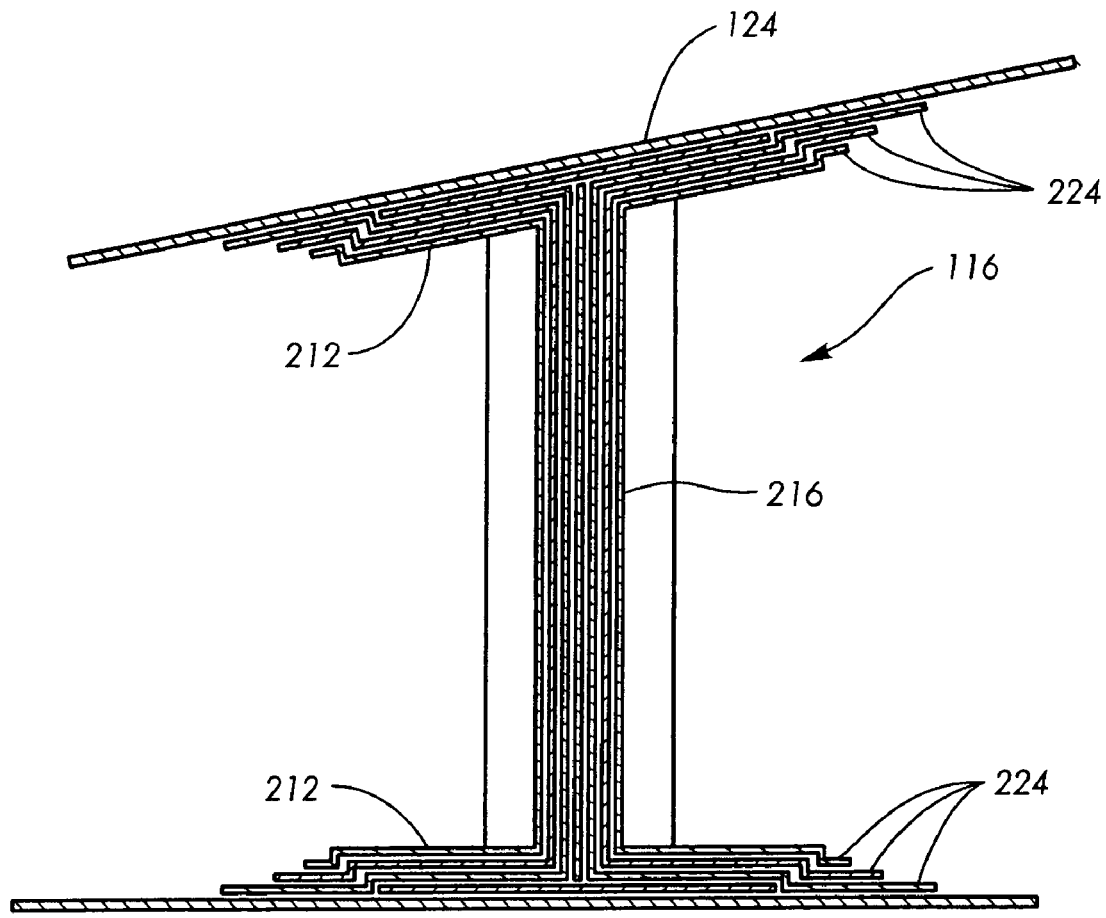
FIG. 2 is a side view of one embodiment of a spar.

Referring now to FIG. 2, a cross-section of wave-shaped spar 116a is illustrated. While a wave-shaped spar 116a is illustrated, the features of the cross-sectional view may be applied to a straight spar 116b or otherwise shaped spar 116. The spar 116 may be comprised of a plurality of layers of composite material. The layers of composite material may be formed into an I-beam. An I-beam may be preferable for a structural member of an aircraft wing 100. I-beams provide superior bending, torsional, and sheer characteristics which are known to those having skill in the art.

The spar 116 may be comprised of a spar cap 212 and a webbing 216. Generally in an I-beam configuration, the different sections of the I-beam have different load bearing functions. The webbing 216 is generally configured to receive and manage the sheer stress placed on the spar 116. Additionally, the webbing 216 provides buckling resistance for selective loads. The spar cap 212 also provides buckling resistance as well as torsion resistance. However, the same characteristics may be accomplished with other cross-sectional shapes of the spar 116, such as a C-beam and J-beam.

The orientation of the filament bands for each of the sections of the spar 116 will vary depending upon the loads placed upon the section. For example, the webbing 216 generally receives a significant portion of the shear stress. Because sheer stress is maximum at a 45° angle, it may be preferred for the orientation of some of the filament bands and webbing 216 to also be at a 45° angle, where the angle is referenced from the spar cap 212.

Similarly, the orientation of the filament bands in the spar cap 212 may be oriented to receive loads placed upon the spar cap 212. For example, the filament bands in the spar cap 212 may be aligned at a 0° angle from the length of the spar 116. As such, loads placed upon the wing tip 120 will place the filament bands within the spar cap 212 in tension, where a tensile load on a filament band is preferable.

As illustrated in FIG. 2, the spar 116 may be made of multiple layers of composite material. Each layer may have a different material composition, including different orientations, different thicknesses, and different fiber materials. For example, the wing 100 may be substantially made of carbon fibers and have intermittent fiberglass, Kevlar, silicon carbide, or other materials. By varying the composition of the composite materials, each individual section of a spar 116 may be precisely designed for the loads placed upon the spar 116. The materials of the flying surfaces 124 may similarly be varied from layer to layer.

Additionally, the flying surface 112 may be comprised of multiple layers of composite material. The composite material may likewise have various layers with different orientations. The number of layers and orientations may also vary throughout the different areas of the flying surface 112. For example, areas of high stresses may require additional layers of composite material in order to receive the stresses.

In other embodiments, the multiple layers of the composite material may be manufactured with different orientations during a single process. Such a process would create the multiple layers for a given part, as well as the different orientations of the filament bands during a single process. This process may be a filament winding process, where the number of layers and orientations of the filament bands are wound onto a mandrel or drum. By creating the desired number of layers as well as the desired orientations of a composite material during the manufacturing process, the number of steps to assemble the wing 100 may be reduced.

The composite material may be provided in generally large wound or woven sheets of composite material made of multiple bands of composite fibers. The sheets of composite material may have similar characteristics to fabric, where the composite material is drapable. The sheets of composite material may also be cut into various shapes in order to form the wing section. One such composite material is known in the field as FybeX.

The composite material may also include a conductive layer to insulate the wing 100 and wing structures against lightening strikes. The conductive layers may be comprised of a copper, aluminum, or other conductive metal that is wound into the outer layer of the composite material when the composite material is being manufactured. The layer may be comprised of various strands of the conductive material. During assembly, the conductive material is oriented such that it is positioned on the exterior of the wing 100. Thus, the wing 100 may be protected from lightning strikes.

The composite material used for the wing 100 may be comprised of filament bands pre-impregnated with a resin before the filament bands are wound into a sheet of composite material. By pre-impregnating the composite material with the resin, the resin will be present between the various layers of the spar 116 and the flying surface 112. An evenly distributed quantity of resin will increase the strength of the cured composite material. The resin may include different epoxies and hardeners, such as a phenolics and bisphenols.

The layers of composite materials may further have multiple step-down sections 224 where the different layers join one another. The step-down sections 224 allow for a smooth transition between the spar cap 212 and the flying surface 112. The step-down sections 224 prevent locations of large stress risers from developing. The stress risers will occur in the locations of sudden and drastic changes in the material thickness. However, by providing a smooth transition for the parts within the composite wing 100, the stress at the junctures and intersections of the components may be limited.

In the I-beam embodiment, a spar 116 having an I-shaped cross-section may be formed by laying out two C-shaped sections of composite material back to back such that it forms an I-beam. The two C-shaped sections of composite material may be made from a generally elongated rectangular sheet of composite material. The rectangular sheet of composite material may simply be folded into a C-shaped section and joined with another C-shaped section to form an I-beam. Such a procedure would allow for easier manufacturing steps than would be possible when working with an I-beam.

Other structural members, such as a slosh gate 144 or rib, may be created using a similar layering technique. The function of the part should be considered when selecting the number of layers, the filament band orientations, and general structure of the part. For example, a slosh gate 144 may not be required to bear a large load. Thus, the slosh gate 144 may require fewer layers than would be required from a rib or other load bearing member.

Once the composite material is manufactured, the composite materials are formed into a wing 100 shape. Various methods may be implemented in order to form the composite material into a wing 100. Generally, the process for forming a single piece co-cured wing 100 is comprised of orienting the various composite materials into the proper shapes for the wing 100 and then curing the composite material.

Figure 3:
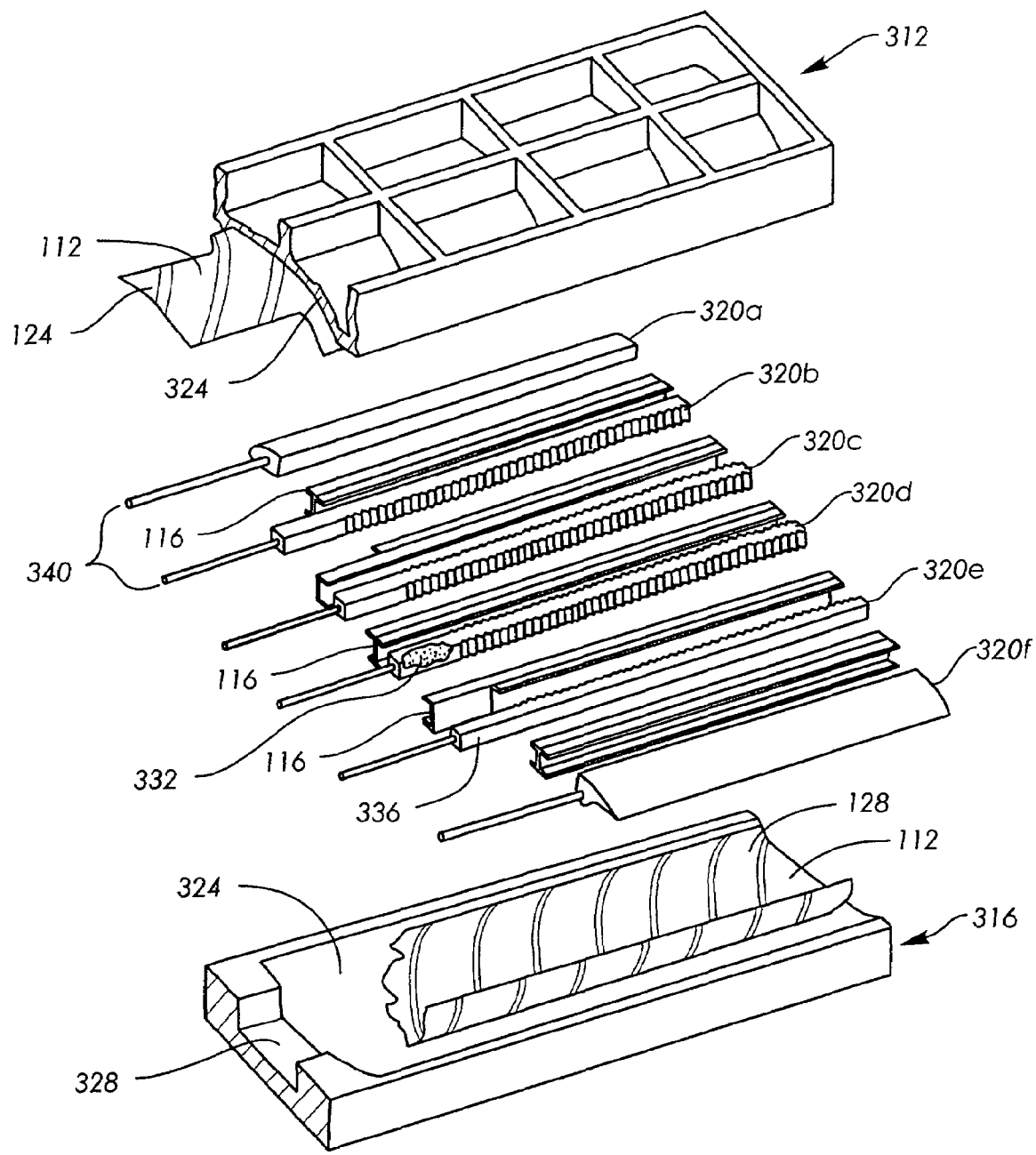
FIG. 3 is an exploded assembly view of a method for assembling a composite wing.

FIG. 3 illustrates one embodiment for manufacturing a composite wing 100. The method for controlling the shapes and contours of the composite wing 100 may be accomplished through a plurality of clamshell frames 312, 316 and a plurality of pressurizable forms 320. Many composite materials have fabric-like characteristics when uncured. Forming an uncured composite material into a desired shape and holding the material in that shape while being cured can be particularly difficult in a single piece co-cured wing 100. The clamshell frames 312, 316 and pressurizable forms 320 are configured to hold the fabric-like composite material into the desired shape while being assembled and cured.

The clamshell frames 312, 316 may be comprised of an upper clamshell frame 312 and a lower clamshell frame 316. The upper clamshell frame 312 substantially defines the upper flying surface 124 and the lower clamshell frame 316 substantially defines the lower flying surface 128. The clamshell frames 312, 316 are essentially frames that define the shape of the exterior of the wing 100.

Alternatively, the clamshell frames 312, 316 may be divided into two different sections, such that a first clamshell frame defines the leading edge 136 of the wing 100 and the second clamshell frame defines the trailing edge 138 of the wing 100. Furthermore, more than two clamshell frames may be used in order to form a wing 100. The clamshell frames 312, 316 may also be pivotably attached to one another. The pivotal attachment would allow the sections of the clamshell frames 312, 316 to be closed on one another.

In the embodiment illustrated in FIG. 3, the clamshell frames 312, 316 are egg crate structures having a generally solid controlling surface 324 to control the shape of the composite material. The clamshell frames 312, 316 may be made of any suitable rigid material, such as metal, composite material, plastics, or the like. However, the material may be preferably lightweight to allow for easy transportation and movement. Generally, the structure of the clamshell frames 312, 316 may be any structure which supports the controlling surface 324.

Figure 4:
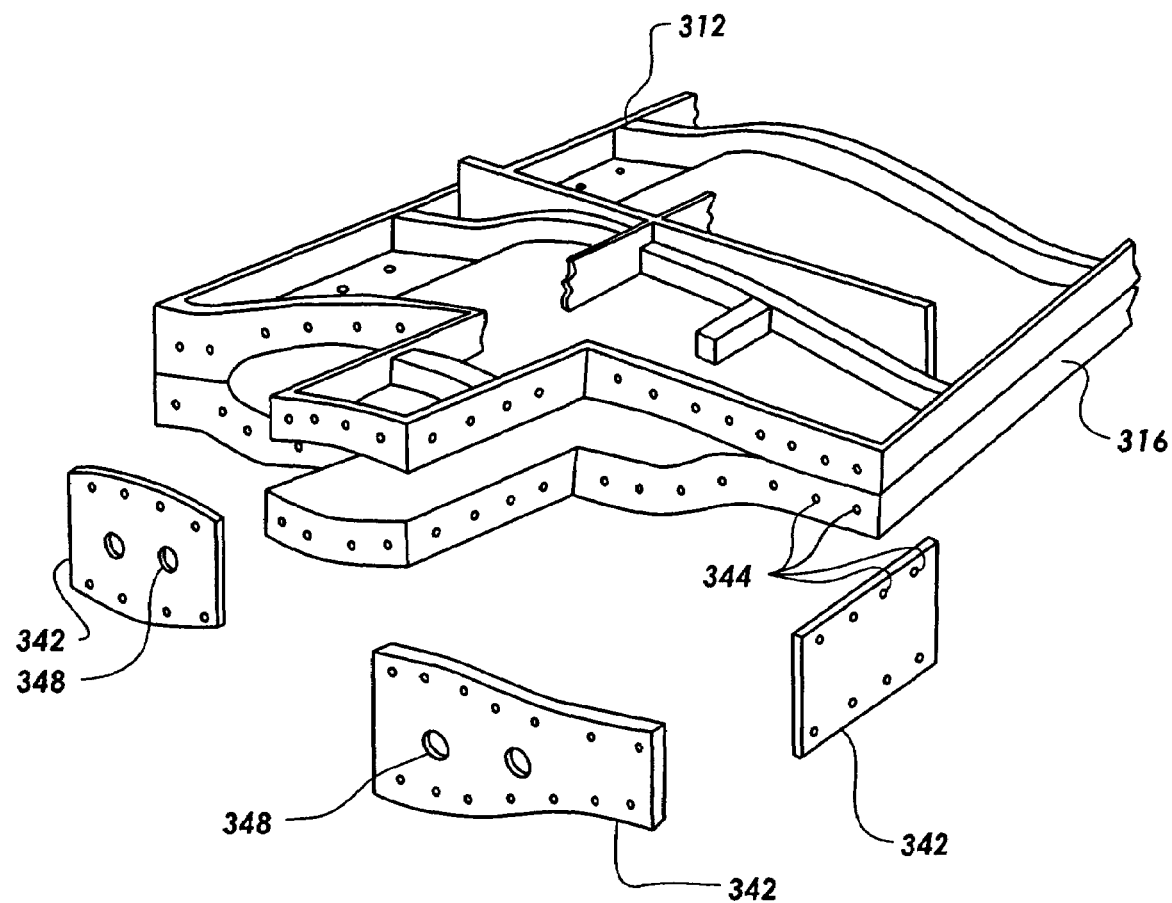
FIG. 4 is a perspective view of a clamshell frame and end plates.

The upper clamshell frame 312 and the lower clamshell frame 316 are configured to connect in order to form a generally enclosed structure. In the embodiment illustrated, the clamshell frames 312, 316 connect to form a wing 100 having open ends at either side, as illustrated in FIG. 4. One side of the clamshell frames 312, 316 may include a wing box cavity 328. Other openings may be present in the clamshell frames 312, 316 in order to form the various structures of the wing 100.

The controlling surfaces 324 may have a surface finish that is desirable to be applied to the wing 100. The surface finish of the controlling surface 324 will be transferred to the composite material in contact with the controlling surface 324. Thus, the surface finish of the controlling surface 324 of the clamshell frames 312, 316 should be selected to allow the application of paint and provide for desirable aerodynamic characteristics.

While the clamshell frames 312, 316 define the outer dimensions of the wing 100, the pressurizable forms 320 define the shape of the internal structural members and place a biasing force on the composite material against the clamshell frames 312, 316. Generally, the pressurizable forms 320 may be any structure that can control the shape of the composite material during the curing process.

In one embodiment, the pressurizable forms 320 are comprised of a foam core 332 surrounded by a membrane 336. The foam core 332 is configured to be placed in contact with a composite material in order to define the shape of the composite material. As previously illustrated, some of the composite spars 116 have sinusoidal shaped sections. In order to define the sinusoidal shaped sections or other wave-shaped sections, the foam core 332 is formed having sinusoidal shaped sides. The foam core 332 may be molded or cut into the desired shapes and contours.

Additionally, the shapes and contours of the foam core 332 should correspond to the shapes and contours of adjacent pressurizable forms 320. This correspondence creates a form to control the shape of the composite material. For example, where one foam core 332 has a peak in the sinusoidal wave, an adjacent foam core 332 will have a valley in the sinusoidal wave. Thus, by placing a piece of composite material between the two foam cores 332, the composite material will be forced into a wave shape.

The foam cores 332 of the pressurizable forms 320 may be covered by a membrane 336. The membrane 336 may consist of any number of elastic materials, such as silicon. The membrane 336 may serve several functions in the pressurizable forms 320. First, the membrane 336 may provide a barrier between the composite material and the foam cores 332. During curing, portions of the foam cores 332 may become imbedded into the resin of the composite material. However, the use of a membrane 336 prevents the resin from coming into contact with the foam core 332.

Another function of the membrane 336 is to protect the foam core 332 from being damaged during assembly. Foam is susceptible to having its edges damaged and to having unwanted shapes placed into its surface by minimal contact with other objects. By covering the foam core 332 with a membrane 336, the integrity of the foam core's shape may be maintained.

The membrane 336 also receives air input in order to pressurize the form 320. The membranes 336 may substantially surround the foam cores 332, such that when a gas enters the membrane 336, the pressurizable form 320 partially inflates. The gas may enter the membranes 336 through inlet pipes 340 or other similar input mechanism. The inlet pipe 340 may be attached to a pressurize gas source, in order to pressurize the forms 320.

The pressure within the forms 320 will vary depending upon the membrane 336 material and the thickness of composite material. Thicker composite materials and stiffer membranes 336 materials will require higher pressures in order to force the composite material into the desired shape and hold the materials in that shape during curing. In one embodiment, the pressure may be between 30 psi and 50 psi for one type of silicon membrane 336 and composite material configuration. However, other membranes 336 and composite materials may require pressures above 50 psi or, alternatively, pressures below 30 psi.

The pressurization of the forms 320 provides several functions. One function of the pressurization of the forms 320 is to force the composite form 320 against an adjacent form 320 or clamshell frame 312, 316. The force created by multiple pressurized forms 320 will force the composite material to the shapes and contours of the forms 320 or clamshell frames 312, 316.

Additionally, non-pressurizable forms may be employed. The non-pressurizable forms may be similar to pressurizable forms, however, the non-pressurizable forms will not be inflated during the curing process. The non-pressurizable forms may bias against the pressurizable forms in order to shape the composite material. However, it may be preferable for all the forms to pressurizable. The use of all pressurizable forms allows the composite material to be uniformly biased against the controlling surfaces 324 of the frames 312, 316.

The pressurizable forms 320 also allow for a degree of tolerance in the size of the forms 320. Winding or laying up multiple layers of composite materials can create a composite material having area of varying thickness and resulting in a generally low tolerance. Similarly, foam cores 332 and the surrounding membranes 336 will also have a low tolerance. To compensate for the low tolerance, the pressurizable forms 320 expand to fill whatever space is available between the pressurizable forms 320 and the composite material.

A further advantage of the pressurizable forms 320 is the force placed upon the composite materials by the pressurizable forms 320. As was illustrated in FIG. 2, the composite structures are typically made of multiple layers of composite materials. It is generally preferred that the number of vacancies or air pockets within the composite material to be minimized. In order to accomplish this, the pressurizable forms 320 place a force on the multiple layers of composite materials, forcing the layers together. As the layers of composite material are forced together, the air pockets are expelled and the vacancies are filled.

The membrane 336 may be wrapped around the foam core 332 by providing the membrane 336 in a generally tubular and flexible section. The tubular section of membrane 336 may be opened by inserting the membrane 336 into a tube and then sealing the edges of the membrane 336 against the tube. A vacuum may then be applied to the side of the tube to force the tubular section of membrane 336 to open. The foam core 332 may then be inserted into the opened membrane. Once the foam core 336 is in place, the vacuum may be removed and the membrane may be allowed to wrap around the foam core 332.

The size and shape of the pressurizable forms 320 will depend upon the type of wing 100 and the internal structure of the wing 100. The pressurizable forms 320 of FIG. 3 are configured to create a wing 100 having five spars 116, where the three central spars 116a are sinusoidal shaped, and have no slosh gates 144. To achieve this configuration of the wing 100, different shapes of pressurizable forms 320 are used.

The first pressurizable form 320a, establishing the leading edge 136 of the wing 100, has one side having a curved edge and the other side having generally flat sections to create a straight spar 116b. The first pressurizable form 320a forces the composite material against the leading edge 136 of the clamshell frames 312, 316. The second pressurizable form 320b may have a straight side and a sinusoidal side. The straight side abuts the straight side of the first pressurizable form 320a and the sinusoidal side of the second pressurizable form 320b abuts the sinusoidal side of the third pressurizable form 320c. The other pressurizable forms 320d, 300e, 300f have other similarly shaped sides to control the shape of the structural members.

The pressurizable forms 320 may transition from straight to sinusoidal shaped on a single side of the pressurizable form 320, such as depicted in the third pressurizable form 320c. The transition between a wave-shape to a straight section of the pressurizable forms 320 may be required in order to allow attachment of different structures or transition from different parts. For example, in the embodiment illustrated in FIG. 3, the pressurizable forms 320 have a section in order to form the wing box 148. Other embodiments may have flat sections in order to attach a slosh gate 144, wire harness, hydraulic line, etc.

Furthermore, the length of the pressurizable forms 320 may also vary in order to accommodate the different shape of a wing 100 or different structural members. For example, a wing 100 having slosh gates 144 may replace a single pressurizable form 320 with three smaller pressurizable forms aligned axially. Thus, composite material may be placed between the smaller pressurizable forms in order to create the slosh gates 144 or other features.

Once the clamshell frames 312, 316 and pressurizable forms 320 are provided, the composite wing 100 may be assembled. First, the composite material for flying surfaces 112 are laid out on the clamshell frames 312, 316. In one embodiment, the composite material for the lower flying surface 128 is placed on the lower clamshell frame 316 and the composite material for the upper flying surface 124 is placed on the upper clam shell frame 312. The upper clam shell frame 312 may be turned upside down from what is illustrated in FIG. 3 in order to place the composite material for the upper flying surface 124 on to the upper clam shell frame 312.

The composite material is preferably slightly tacky in order to allow for the composite material to adhere to the clamshell frames 312, 316 and the pressurizable forms 320. By using a tacky composite material, the composite material may be placed on the various supporting structures without the use of additional attachment devices or substances. Thus, the composite material for the upper flying surface 124 may be adhered to the controlling surfaces 324 of the upper clam shell frame 312, such that the upper clamshell frame 312 may be turned over to attach to the lower clamshell frame 316 without disturbing the upper flying surface 124 composite material.

In order to uniformly adhere the composite material to the clamshell frames 312, 316, the composite material may be vacuum pressed onto the surfaces 324 of the clamshell frames 312, 316. An air tight material, such as a plastic, may be placed over the surface 324 and sealed around the edges. A vacuum may then be applied to the air tight material and the air evacuated. Once the air is evacuated, atmospheric pressure will apply a substantially uniform force on the composite material, adhering the composite material to the surface 324 of the clamshell frames 312, 316.

The present invention also allows for a primer layer to be co-cured to the surface of the composite wing 100. To create a primer layer co-cured to the wing 100 a primer is applied to the controlling surfaces 324. The primer may be sprayed, rolled, or brushed on to the controlling surfaces. Once the primer is applied to the controlling surfaces 324, the upper flying surface 124 and lower flying surface 128 composite materials are placed on the primed controlling surfaces 324. As the composite materials of the flying surfaces 124, 128 are biased against the controlling surfaces 324, the composite materials are cured to the primer present on the controlling surfaces 324.

Once the wing 100 is cured, the wing 100 is removed from the frames 312, 316. As the wing 100 is removed, the primer will release from the controlling surface and remain bonded to the wing 100. This process allows for the cycle time of manufacturing to be reduced by limiting the number of post curing processes. Additionally, the surface finish of the primer can be defined by the surface finish of the controlling surface 324, when the primer dries on the controlling surface 324. Thus, the external dimension and finishes of the primer may be controlled by the controlling surfaces 324 of the frames 312, 316.

As previously discussed, the material comprising the flying surfaces 112 may be a single piece or multiple pieces. In a wing 100 using a single piece of composite material for the flying surface 112, the single piece of composite material may be placed on the lower clamshell frame 316. Once the forms 320 and composite materials are in place, the single piece of composite material may be folded over in order to form the upper flying surface.

Furthermore, the lower flying surface 128 need not necessarily be entirely on the lower clamshell frame 316. Likewise, the upper flying surface 124 may not be entirely on the upper clamshell 312. A portion of the upper flying surface 124 may extend down to the lower clamshell frame 316 or vice versa. This may occur where it is not desirable for the intersection of the composite materials forming the flying surface 112 to occur at the leading 136 or trailing edge 138 of the wing 100.

Once the composite material for the flying surfaces 112 is positioned, the spars 116 may be formed with the pressurizable forms 320. In one embodiment, the composite material for the spars 116 is provided in C-shaped sections. The C-shaped sections may be placed back to back in order to form an I-beam. The C-shaped sections may be preferable because it may be comprised of an elongated rectangular section of composite material folded on two sides to make a C-shaped section, reducing the complexity of the composite material.

In one embodiment, the C-shaped sections are partially wrapped around a side of the pressurizable forms 320. A single pressurizable form 320 may receive and shape more than one section of composite material. For example, two C-shaped sections of composite material may completely wrap around a pressurizable form 320, such that the two C-shaped sections contact one another. Alternatively, the C-shaped sections of composite material may only cover a portion of the side of the pressurizable from 320.

Again, the use of a tacky composite material allows the composite spar 116 material to attach to the pressurizable forms 320 and allow for the pressurizable forms 320 to be moved and positioned without the composite material falling off. Once the C-shaped sections are attached to the pressurizable forms 320, the pressurizable forms 320 may be laid out on the lower clamshell frame 316. As the pressurizable forms 320 are laid out on the lower clamshell frame 316, the various C-shaped sections will be lined back to back, forming I-beams.

In an alternative embodiment, the composite material for the spars 116 may be provided in I-beam shaped sections where the composite material is wrapped around multiple forms at one time. In yet another embodiment, a composite spar 116 may be provided in individual sections of spar caps 212 and webbings 216. However, increasing the number of pieces and complexity of the shapes of the composite material will increase the manufacturing time and costs.

Once the pressurizable forms 320 and the attached composite material are laid out on the composite material of the lower flying surface 128, the composite material for the upper flying surface 124 may be placed on top. Multiple layers of composite material for the flying surfaces 112 may be used. The upper clamshell frame 312 may then be placed upon the lower clamshell frame 316, enclosing the composite material and pressurizable forms 320.

Referring now to FIG. 4, the upper clamshell frame 312 and the lower clamshell frame 316 are shown in a closed state. The attachment of the upper clamshell frame 312 and the lower clam shell frame 316 form the inner volume that is wing shaped. The attachment of the clamshell frames 312, 316 should be sufficient to maintain an outward force created by the pressurizable forms 320.

A plurality of end plates 342 may be attached to the ends of the clamshell frames 312, 316 in order to seal the ends of the clam shell frame 312, 316. The end plates 342 may be attached to the clam shell frames 312, 316 through a number of different fasteners, such as screws or bolts. A plurality of mounting holes 344 may be placed within the end plates 342 and clam shell frames 312, 316. The end plates 342 may have a similar function to that of the pressurizable forms 320 and controlling surfaces 324, by controlling the shape of the composite material during the curing process. The pressurizable form 320 will press the composite material against the end plates 342 of the clamshell frames 312, 316. The end plates 342 also prevent portions of the composite material from extending out of the clam shell frame 312, 316.

Another function of the end plates 342 is to support the inlet pipes 340, as illustrated in FIG. 3, that extend from the pressurizable forms 320. A plurality of apertures 348 may be placed in the end plates 342 to receive the inlet pipes 340. The inlet pipes 340 may then be attached to a pressurized gas source to inflate the pressurizable forms 320.

Once the composite materials and pressurizable forms 320 are positioned within the clamshell frames 312, 316, the forms 320 may be pressurized by the pressurized gas source. As the pressurizable forms 320 pressurize, the force of the expanding membranes 336 force the composite material against the internal surfaces of the clamshell frames 312, 316 and also force the pressurizable forms 320 against one another. The composite material is then cured while the forms 320 are pressurized. As the composite material is cured, the material will be held in position by the pressurized forms 320. Thus, the composite material may be forced into the shape defined by the clamshell frames 312, 316 and the pressurizable forms 320.

As the composite material cures, the separate sections of composite material will be joined together. The joining of the composite materials is assisted by the pressure of the pressurizable forms 320, forcing the pieces of composite material against one another. As the pieces of composite material are cured, the members of the wing 100 create a single piece structure.

Different composite materials require different cure times and temperatures. The cure times and cure temperatures must be selected for each individual composite material according to the thicknesses and construction of the wing 100. Additionally, the pressure within the pressurizable forms 320 may be varied at different stages of the curing process.

During or after the curing process, the pressurizable forms 320 may be heated to a temperature such that the foam cores 332 of the pressurizable forms 320 shrink. The shrinkage of the foam should be sufficient to allow the remaining foam core 332 to be removed from the wing 100. Once the foam core 332 is removed, the membrane 336 may be removed from the internal surfaces of the composite wing 100.

The method described above is only one embodiment that may be employed to create a single piece co-cured composite wing. This application contemplates multiple other methods of forming such a wing. Generally, the wing is comprised of a composite flying surface, which is comprised of an upper and lower flying surface. The flying surface surrounds a plurality of composite structural members. The composite structural members and the composite flying surface are co-cured in order to form a single piece wing.

Figure 5A:
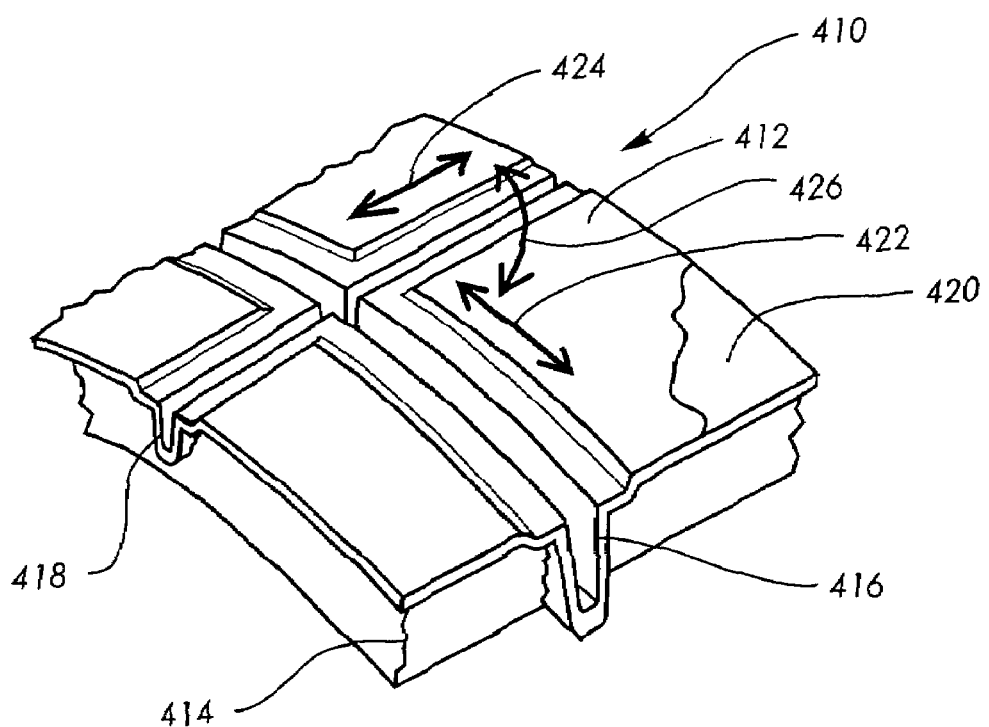
FIGS. 5A-5K are perspective views illustrating the manufacture of a interwoven single piece co-cured composite structure.
Figure 5B:
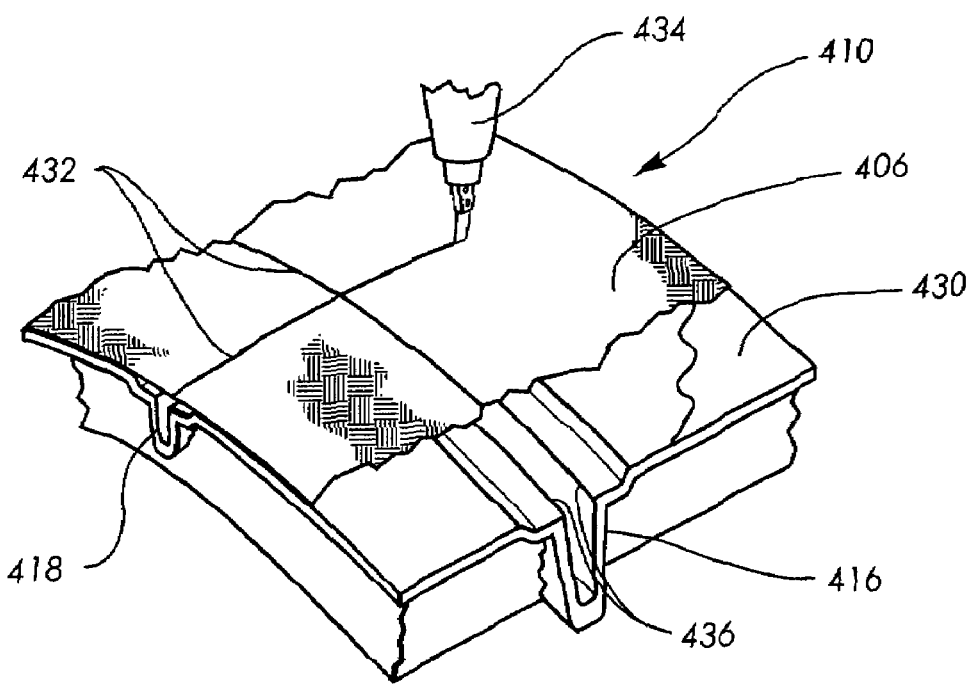
Figure 5C:
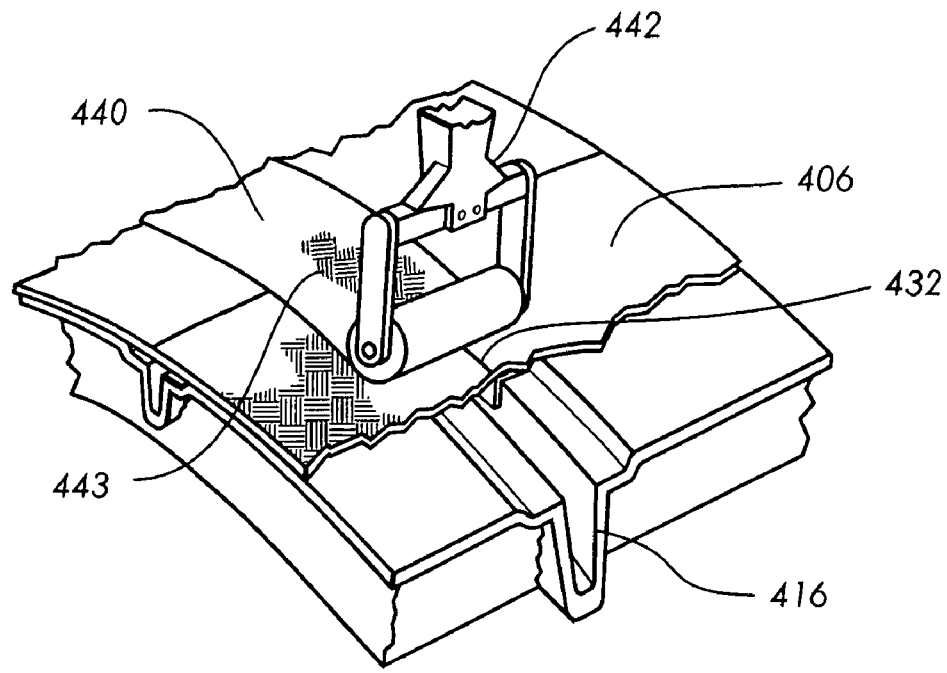
Figure 5D:
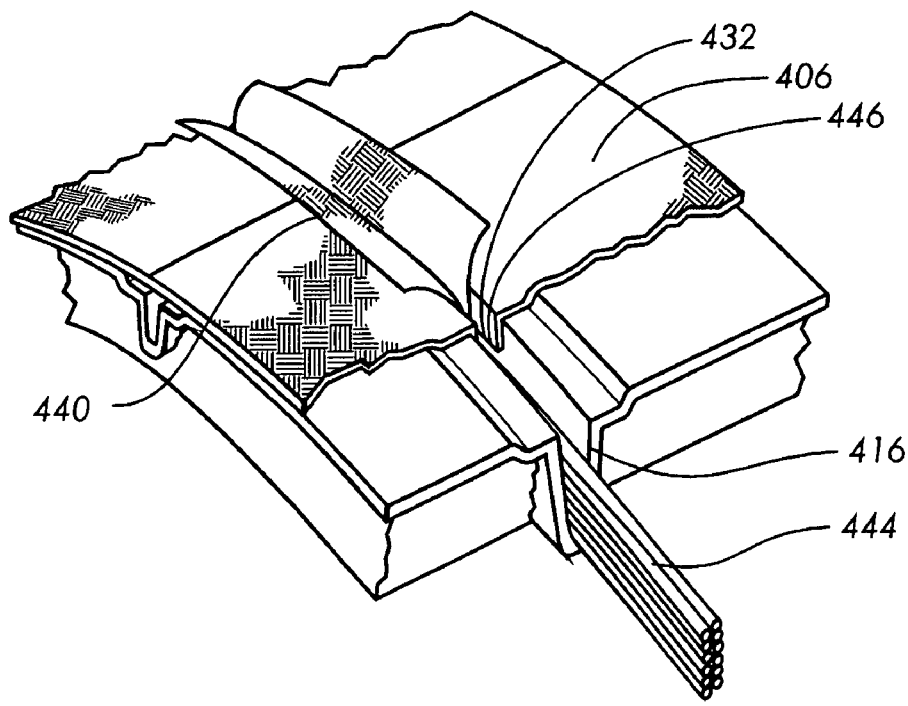
Figure 5E:
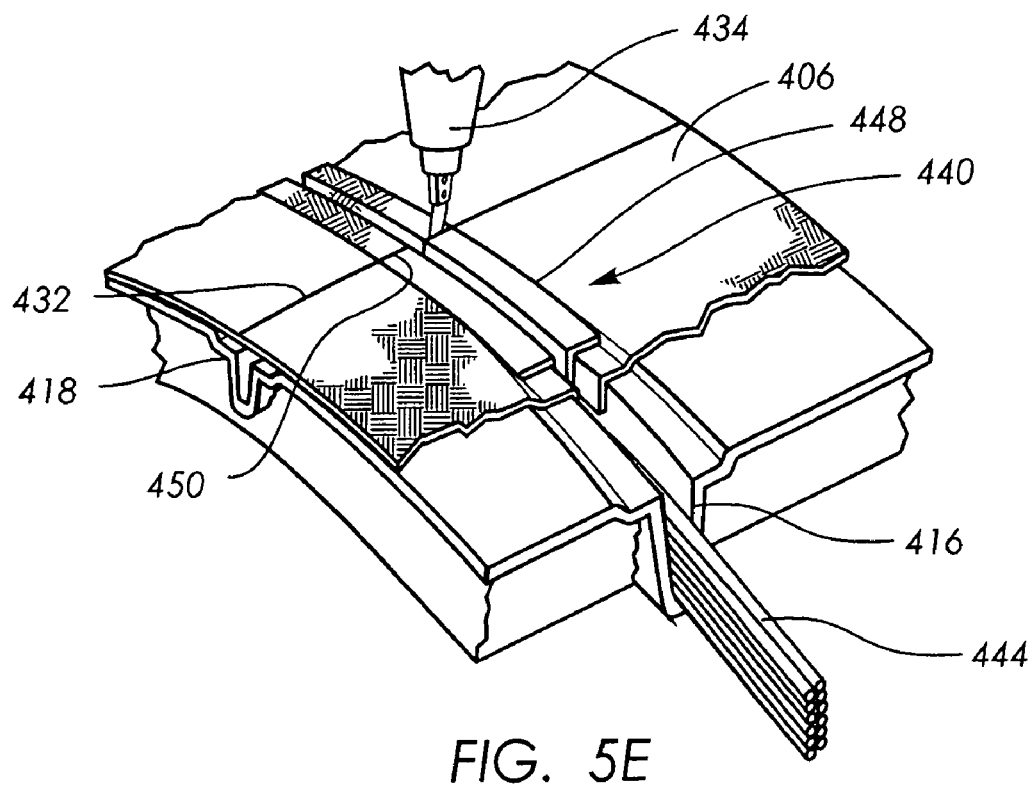
Figure 5F:
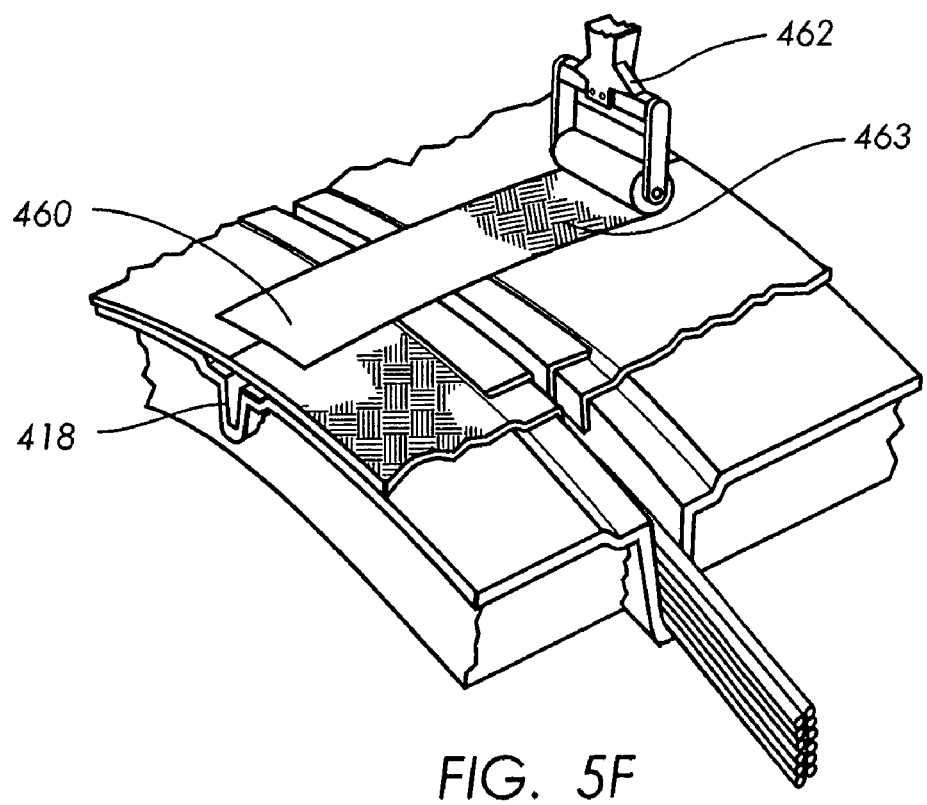
Figure 5G:
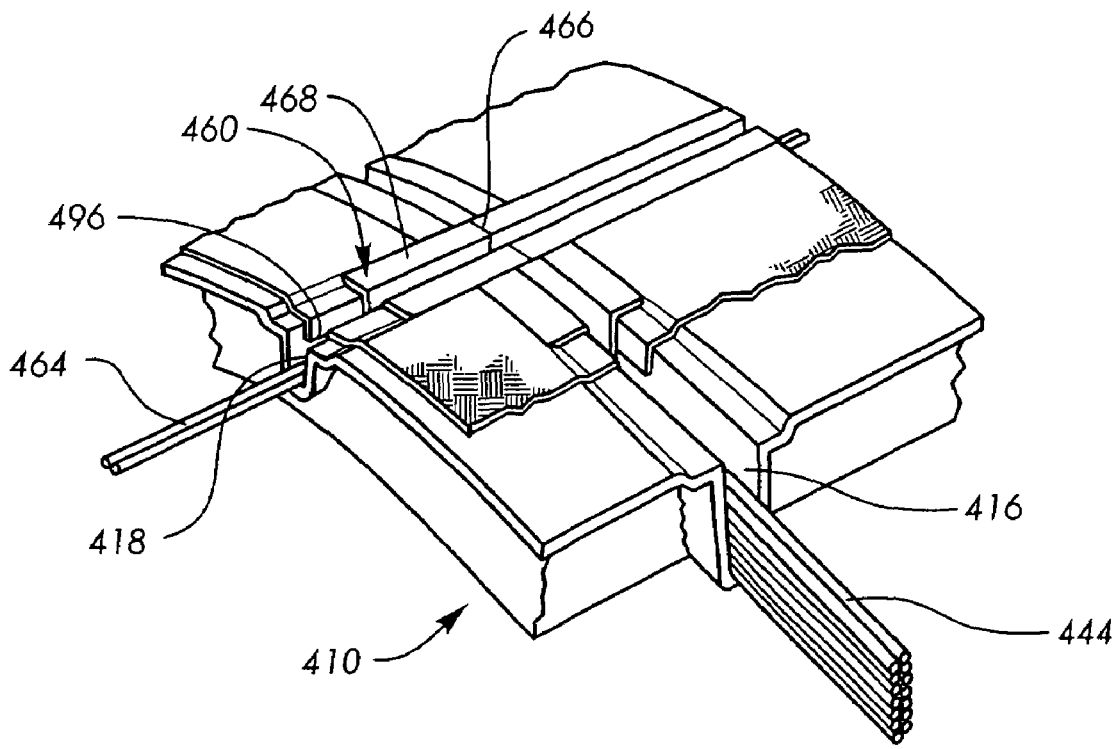
Figure 5H:
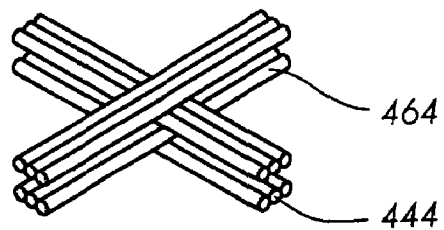
Figure 5I:
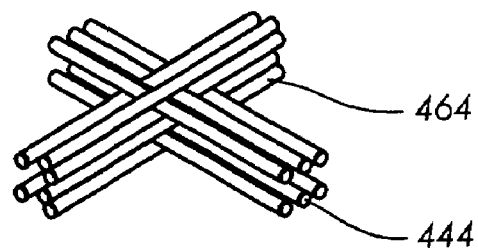
Figure 5J:
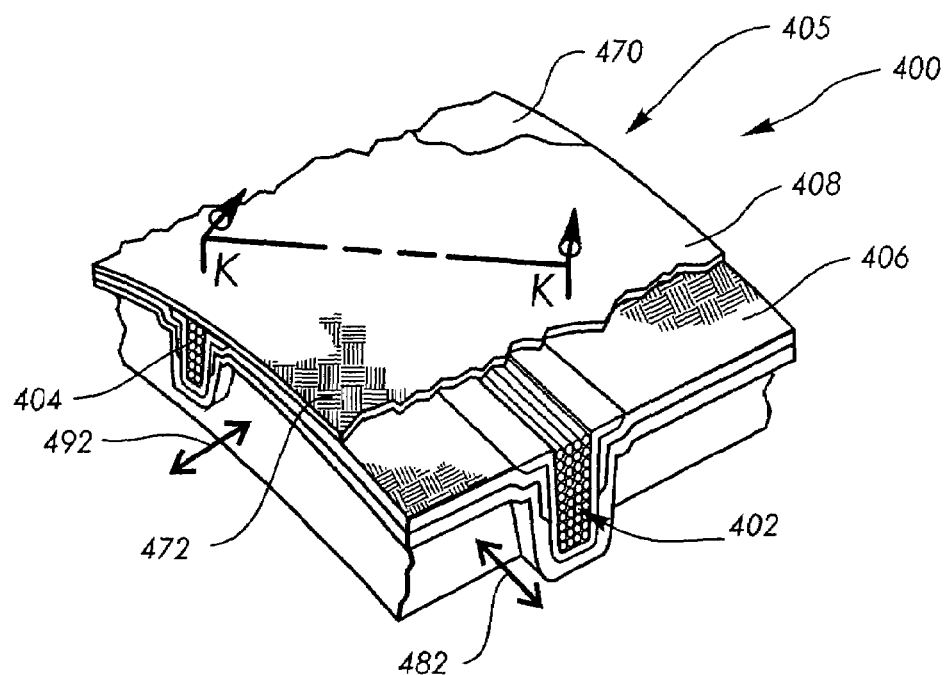

Referring to FIGS. 5A-5K, the perspective and cross section views illustrate a method for making a single piece co-cured structure 400 shown in FIG. 5J, which will be described in detail below. The single piece co-cured structure 400 includes interwoven composite frames 402 and stringers 404. The single piece co-cured structure 400 also includes a skin 405 that may comprise an inner skin 406 and an outer skin 408. The single piece co-cured structure 400 also includes a composite frame 402 interwoven with a stringer 404 to provide superior strength and durability over prior art structures that are made from a plurality of parts attached together by fasteners and adhesives. The single piece co-cured structures 400 according to the invention may be used in aircraft fuselages, automobile frames, a boat frames, any other structure that may include composite frames and stringers. To manufacture a single piece co-cured structure 400 that includes interwoven composite frames 402 and stringers 404, a mandrel 410 (shown in FIG. 5A) is obtained that provides the desired configuration to be formed.

FIG. 5A illustrates a portion of a mandrel 410 shaped for making a composite aircraft fuselage. The mandrel 410 includes a caul sheet 412 and an extractable substructure 414. The caul sheet 412 provides a smooth support surface against which the single piece co-cured structure 400 of FIG. 5J is formed and cured. The caul sheet 412 includes frame provisions 416 and stringer provisions 418. The mandrel 410 may be the pressurizable forms, discussed above, that are comprised of a shaped foam core (not shown) surrounded by a membrane that forms the caul sheet 412. The mandrel 410 may be prepared for use by cleaning the surface of the caul sheet 412. Optionally, the mandrel 410 may be covered by a mold release 420 known in the art.

The frame provision 416 has a length 422 that extends over the mandrel 410. The stringer provision 418 also has a length 424 that extends at an angle 426 to the length 422 of the frame provisions 416. In some configurations, the frame provision 416 may extend perpendicularly to the stringer provision 418.

Once the mandrel 410 is obtained, the inner skin 406 is formed by filament winding composite material over the fuselage mandrel 410. Alternatively, composite material may be formed in sheets or as a tape that is used to cover the mandrel 410 to form the inner skin 406. Additionally, the inner skin 406 may include a layer of primer or resin 430 covering the mandrel 410 prior to filament winding the composite material over the mandrel 410.

Once the inner skin 406 is completely formed, a slit 432 is cut in the inner skin 406 over the frame provision 416 and the stringer provision 418 as shown in FIG. 5B. Optionally, the slit 432 over the stringer provision 418 may be made at a later time. The inner skin 406 may be cut ultrasonically using a numerically controlled ultrasonic slitting machine head adaptor 434 along the frame provisions 416 and the stringer provisions 418 of the mandrel 410. Using the numerically controlled machine head adapter 434, precision-placed slits are possible. In some configurations, it is preferable to place the slit down the middle of the frame provisions 416 and the stringer provisions 418, while in other configurations the inner skin 406 is cut adjacent a side 436 of the frame provisions 416 and the stringer provisions 418.

As shown in FIG. 5C, a frame shear-ply 440, which is one or more layers of composite material, is then applied to the inner skin 406 over the slits 432. The frame shear-ply 440 may be applied by a numerically controlled tape laying machine head adaptor 442 disposed over the frame provision 416 so that the middle of the width of the frame shear-ply 440 is aligned with the slit 432. The frame shear-ply 440 may be composed of fibers 443 oriented at an angle to the length 422 of the frame provision 416. For example, in some configurations the frame shear-ply 440 is oriented about 45° relative to the length 422 of the frame provision 416.

The frame shear-ply 440 is then driven through slit 432 of the inner skin 406 into the frame provision 416 by axial frame material 444 as the axial frame material 444 is wound into the frame provision 416 as shown in FIG. 5D. The axial frame material 444 may comprise unidirectional fibers aligned with the length 422 of the frame provision 416 and wound about the mandrel 410 into the frame provision 416. Alternatively, the axial frame material 440 may include sheets of fibers woven at different angles to the length 422 of the frame provision 416.

As the frame shear-ply 440 is driven into the frame provision 416, the edges 446 of the slit 432 in the inner skin 406 fold into the frame provision 416 as shown in FIG. 5D. The flanges 448 of the frame shear-ply 440 may be rolled on to and smoothed over the inner skin 406 as shown in FIG. 5E. The axial frame material 444 is wound into the frame provision 416 until the axial frame material 444 is about level with the bottom of the stringer provision 418. The frame shear-ply 440 may be cut to form a slit 450 aligned with the slit 432 over the stringer provision 418. Alternatively, the frame shear-ply 440 and the inner skin 406 over the stringer provision 418 may be cut together in one step using the numerically controlled machine head adapter 434.

Once the frame shear-ply 440 is cut, a stringer shear-ply 460 may be applied over the slits 432 and 450 (shown in FIG. 5E) over the stringer provision 418 as shown in FIG. 5F. The stringer shear-ply 460 may be applied by hand, a numerically controlled tape laying machine head adapter 462 as shown, or other means known in the art. The stringer shear-ply 460 is one or more layers of composite material. The stringer shear-ply 460 may be composed of fibers 463 oriented at an angle to the length 424 of the stringer provision 418. For example, in some configurations the fibers 463 are oriented at an angle of about 45° relative to the length 424 of the stringer provision 418.

The stringer shear-ply 460 is driven into the stringer provision 418 by axial stringer material 464 that may be unidirectional fibers aligned with the length 424 (indicated in FIG. 5A) of the stringer provision 418 and wound about the mandrel 410 into the stringer provision 418 as shown in FIG. 5G. Once the stringer shear-ply 460 is disposed within the stringer provision 418, the stringer shear-ply 460 is cut 466 to allow the axial frame material 444 to be wound around the mandrel 410 into the frame provision 416. Additionally, the flanges 468 of the stringer shear-ply 460 are folded over onto the inner skin 406.

As the axial stringer material 464 is wound around the mandrel 410 into the stringer provision 418, the axial frame material 444 is also wound around the mandrel 410 into the frame provision 416 to provide the interwoven frames 402 and stringers 404 shown in FIG. 5J. The axial stringer material 464 may be wound in intervals with the axial frame material 444 so that the axial stringer material 464 and the axial frame material 444 are woven together in successive layers as shown in FIG. 5H. The axial stringer material 464 and the axial frame material 444 may also be woven as shown in FIG. 5H by simultaneously filling the stringer provisions 418 and frame provisions 416 by using unidirectional composite tape. Alternatively, the stringer provisions 418 and frame provisions 416 are filled with the axial stringer material 464 and the axial frame material 444 simultaneously as shown in FIG. 5I.

Once the frames 402 and stringers 404 have been formed, an outer skin 408 is woven or laid up of composite material over the mandrel 510 using filament winding, tape laying, or hand laying techniques known in the art. Composite material tape laying, filament winding, hand lay up and other techniques known in the art may be used to form the inner skin 406, outer skin 408, the frames 402, and stringers 404. The outer skin 408 may include a layer of primer 470 over the composite material to better protect the fibers 472 of the outer skin 408 from impact damage. The primer 470 may be a layer of resin applied to the outer surface of the composite material forming the outer skin 408.

Once the outer skin is wound as shown in FIG. 5J, the composite material of the single piece structure 400 is heated under pressure to co-cure the assembly, which in this embodiment is a fuselage for an aircraft. Once curing of the assembly is complete, the mandrel 410 is removed from the single piece co-cured structure 400.

Figure 5K:
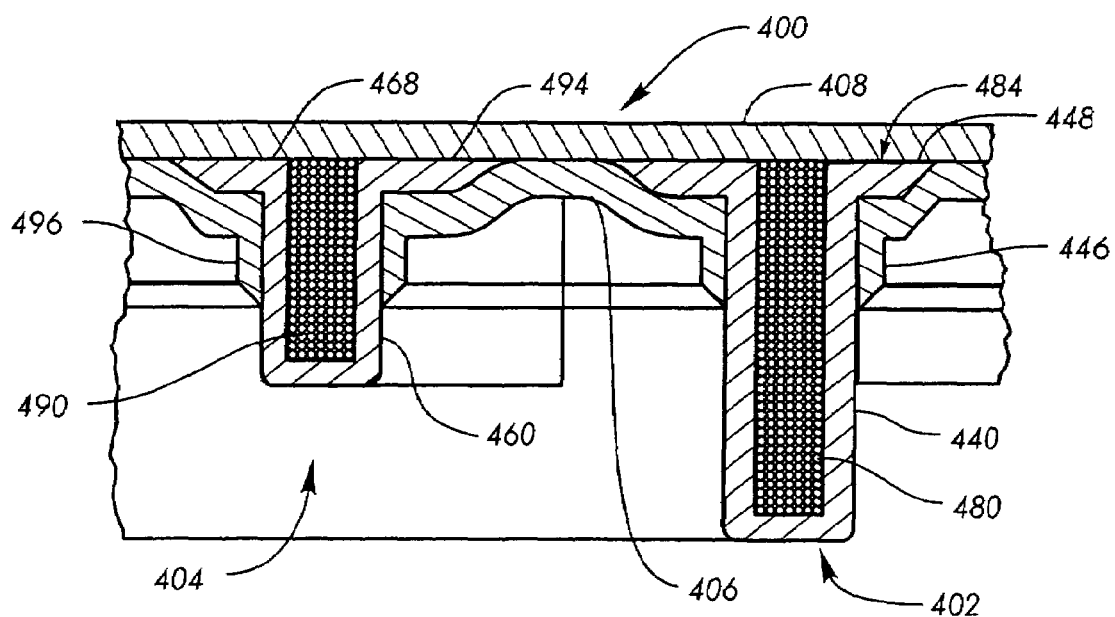

Referring to FIG. 5K, a section view along line K-K generally illustrates the layers of composite material used to construct the frame 402 and the stringer 404 of the single piece co-cured structure 400. The stringer 404 extends perpendicular to the frame 402. As shown, the frame 402 and the stringer 404 have a T-shaped cross sectional shape. The frame 402 and the stringer 404 are backed by the outer skin 408 and extend through the inner skin 406.

In this configuration, the frame 402 includes a core 480 of unidirectional composite fibers aligned along the length 482 of the frame 402 illustrated in FIG. 5J. The core 480 may also include a weave of fibers oriented in directions at an angle to the length 482 of the frame 402. The frame shear-ply 440 extends partially around the core 480 and provides additional strength to the frame 402 in directions other than along the length 482 of the core 480. The frame shear-ply 440 also protects the fibers of the core 480 from damage.

The flange 448 of the frame shear-ply 440 is orientated generally parallel to the outer skin 408 and forms a frame base 484. The frame base 484 is interwoven with the inner skin 406 and outer skin 408 of the single piece co-cured structure 400 by extending between the inner skin 406 and the outer skin 408. By having the frame base 484 extend between the inner skin 406 and the outer skin 408, this frame 402 may be three times as strong as a frame that is connected to the inner skin 406 only by resin. The edges 446 of the inner skin 406 also extend past the frame base 484 onto the frame 402 to increase the strength of the interface between the frame 402 and the inner skin 406.

Similarly, the stringer 404 includes a core 490 of unidirectional composite fibers aligned along the length 492 of the stringer 404 illustrated in FIG. 5J. The core 490 may also include a weave of fibers oriented in directions at an angle to the length 492 of the stringer 404. The stringer shear-ply 460 extends partially around the core 490 and provides additional strength to the stringer 404 in directions other than along the length 492 of the core 490. The stringer shear-ply 460 also protects the fibers of the core 490 from damage.

The flange 468 of the stringer shear-ply 460 is orientated generally parallel to the outer skin 408 and forms a stringer base 494 that extends between the inner skin 406 and the outer skin 408. The stringer base 494 is interwoven with the inner skin 406 and outer skin 408 of the single piece co-cured structure 400 by extending between the inner skin 406 and the outer skin 408. By having the stringer base 494 extend between the inner skin 406 and the outer skin 408, this interwoven stringer 404 may be three times as strong as a stringer that is connected to the inner skin 406 only by resin. The edges 496 of the inner skin 406 also extend past the stringer base 494 onto the stringer 404 to increase the strength of the interface between the stringer 404 and the inner skin 406.

Figure 6A:
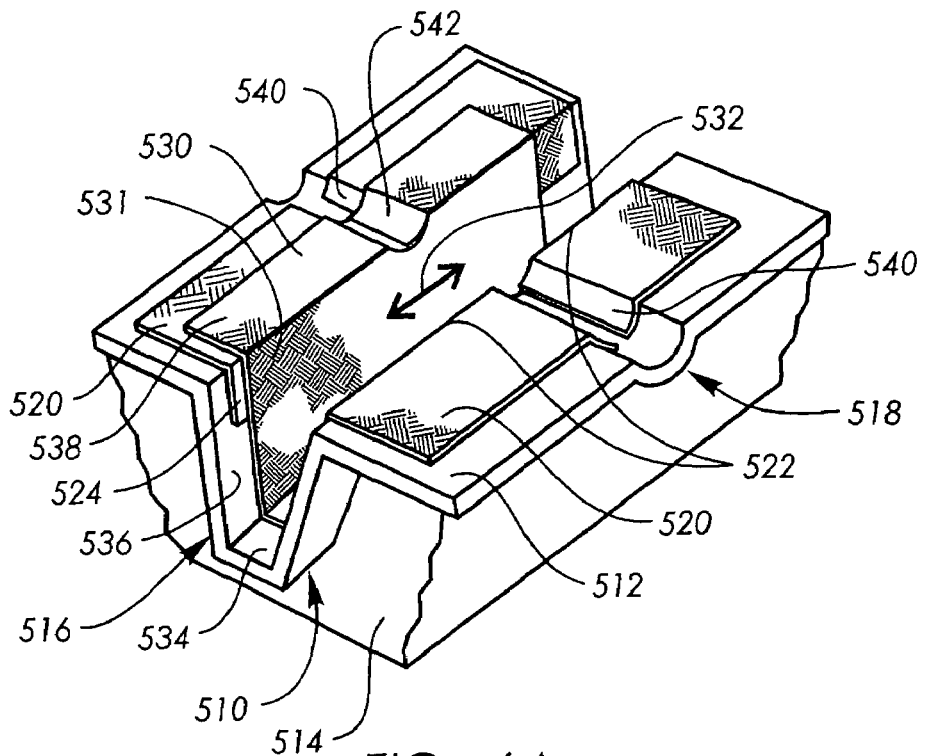
FIGS. 6A-6E are perspective views illustrating the manufacture of an alternative configuration of an interwoven single piece co-cured composite structure.
Figure 6B:
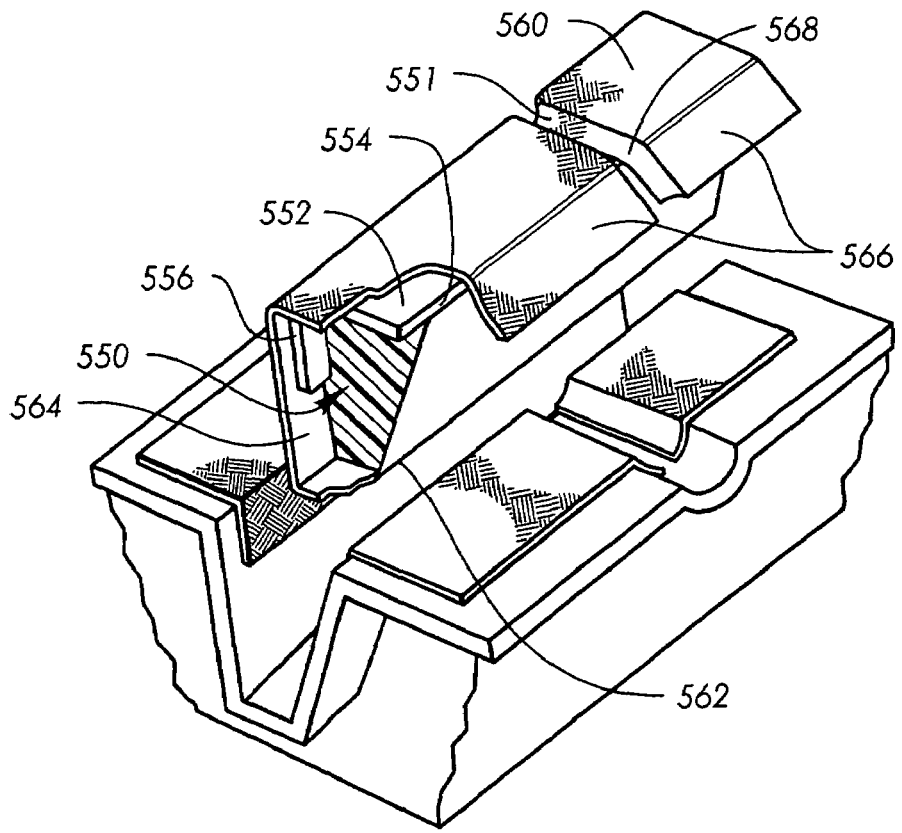
Figure 6C:
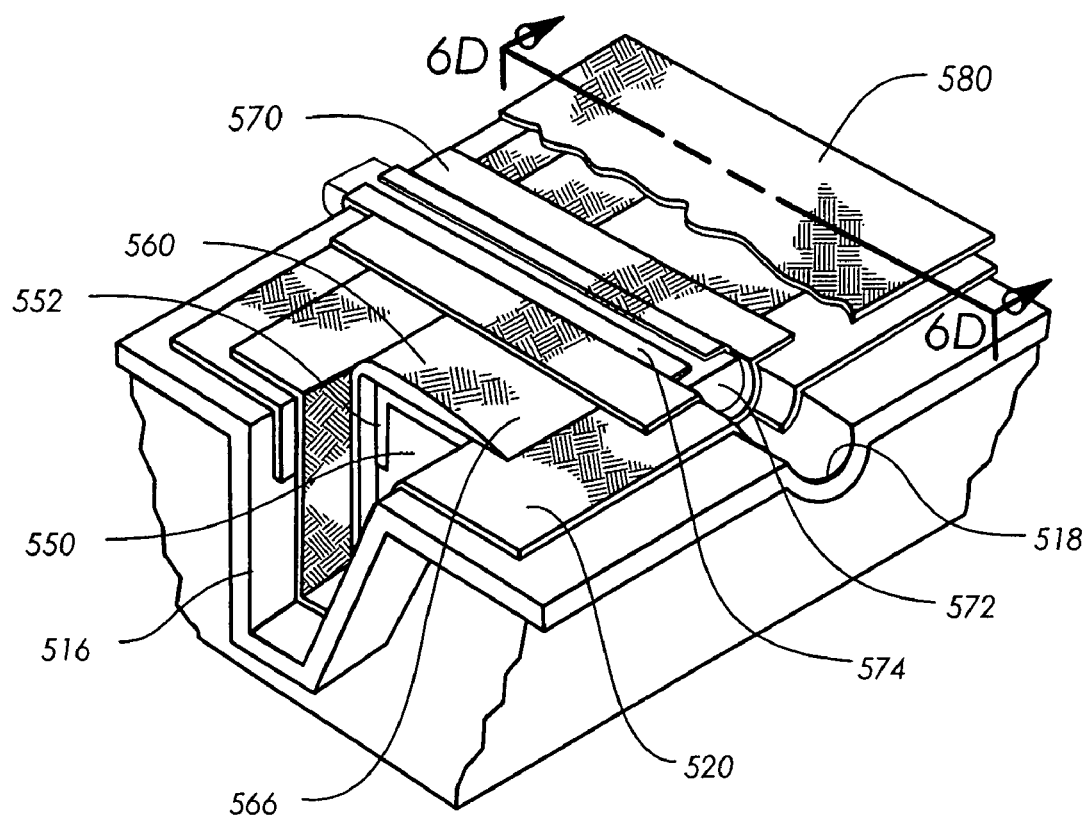
Figure 6D:
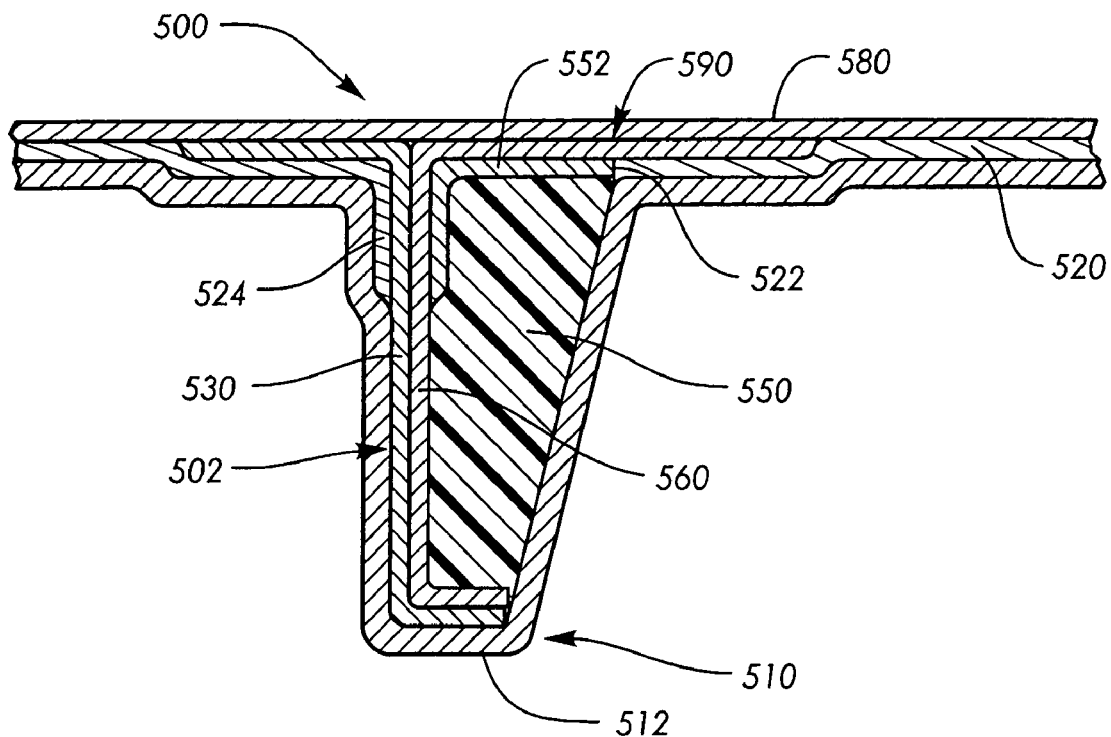
Figure 6E:
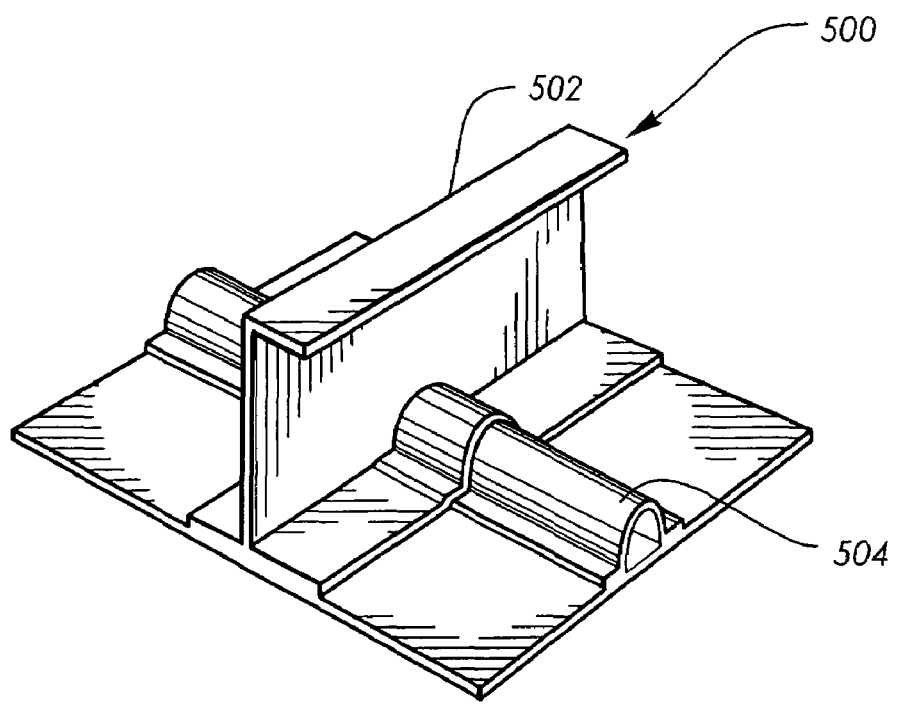

Referring to FIGS. 6A-E, perspective and cross sectional views illustrate the manufacture of a single piece co-cured composite structure 500 as shown in FIG. 6E. The single piece co-cured composite structure 500 includes a frame 502 having a J-shaped cross sectional shape interwoven with a stringer 504 having a Ω-shaped cross sectional shape and a hollow cross section. Other cross sectional shapes of the frame 502 and the stringer 504 may be interwoven together using the methods disclosed herein.

As shown in FIG. 6A, a mandrel 510 is obtained that includes a caul sheet 512 and an extractable substructure 514. The caul sheet 512 includes a frame provision 516 and a stringer provision 518. An inner skin 520 is shown disposed on the caul sheet 512 of the mandrel 510. The inner skin 520 is cut along the frame provision 516 and the stringer provision 518. Along the frame provision 516, the inner skin 520 has been cut at a rim 522 of the frame provision 516. An edge piece 524 of the inner skin 520 is folded into the frame provision 516 opposite the rim 522.

A frame shear-ply material 530 is one or more layers of composite material that may include fibers 531 aligned with or oriented at an angle to the length 532 of the frame provision 516. In some configurations, the fibers 531 orientated about 45° to the length 532 of the frame provision 516. The frame shear-ply material 530 is laid into the frame provision 516 so that it covers a bottom surface 534 of the frame provision 516, one side surface 536 of the frame provision 516, and extends over the inner skin 520 to form a flange 538.

The inner skin 520 and the frame shear-ply material 530 are cut down the middle of the stringer provision 518. The edge pieces 540 of the inner skin 520 and the flange 542 of the frame shear-ply material 530 is folded into the stringer provision 518. Some material of the inner skin 520 and the frame shear-ply material 530 may be removed to better form the edge pieces 540 and the flange 542 in the stringer provision 518.

As shown in FIG. 6B, an insert tool 550 includes an insert stringer provision 551. The insert tool 550 may be an inflatable mandrel that is removed once the single piece co-cured composite structure 500 is cured. The insert tool 550 may be covered with an inner support skin 552. More specifically, the inner support skin 552 covers the upper surface 554 of the insert tool 550 and includes an overhang 556. The inner support skin 552 may have the same fiber orientation as the inner skin and may have a thickness similar to the inner skin 520.

A second frame shear-ply material 560 covers a bottom surface 562, a side surface 564, and over and past the upper surface 554 of the insert tool 550 to form a flange 566. The second shear-ply material 560 is cut along the middle of the insert stringer provision 551 and the edge pieces 568 are folded into the insert stringer provision 551.

As shown in FIG. 6C, the insert tool 550, once covered by the inner support skin 552 and the second frame shear-ply material 560, is inserted in the frame provision 516. The flange 566 of the second frame shear-ply material 560 is positioned on the inner skin 520.

A stringer shear-ply material 570 is centered over the stringer provision 518 and formed to the contour of the stringer provision 518. Once the stringer shear-ply material 570 is positioned, a stringer tube mandrel 572, covered with one or more stringer structural plies 574, is positioned in the stringer provision 518, thus forming the stringer 504 shown in FIG. 6E. In this configuration, the stringer shear-ply material 570 remains uncut and intersection pads are not used.

Once the frame 502 and the stringer 504 shown in FIG. 6E are formed, an outer skin 580 is formed over the mandrel 510 to complete the single piece composite structure 500. The single piece composite structure 500 is then co-cured under pressure. The mandrel 510, insert tool 550, and the stringer tube mandrel 572 may be pressurized to help retain the composite material of the single piece composite structure 500 in position as the composite material of the single piece composite structure 500 is co-cured.

Referring to FIG. 6D, a cross section view along line D-D illustrates the frame 502 of the single piece composite structure 500 disposed on the caul sheet 512 of the mandrel 510. As shown, the insert tooling 550 positions and supports the frame 502 against the caul sheet 512 during assembly and co-curing of the single piece composite structure 500. The frame 502 is backed by the outer skin 580 and extends inward from the outer skin 580 through the inner skin 520. The frame shear-ply material 530 and the second frame shear-ply material 560 form the frame 502 that has a J-shaped cross sectional shape. The frame 502 includes a frame base 590 that is oriented generally parallel to the outer skin 580. The frame base 590 is interwoven with the inner skin 520 and outer skin 580 of the single piece co-cured structure 500 by extending between the inner skin 520 and the outer skin 580. By having the frame base 590 extend between the inner skin 520 and the outer skin 580, the frame 502 may be three times as strong as a frame that is connected to the inner skin 520 only by resin.

The inner support skin 552 balances the edge piece 524 of the inner skin 520 in support of the frame 502. Additionally, the manufacturability of the single piece composite structure 500 is enhanced by cutting the inner skin 520 at the rim 522 of the frame provision 516.

Figure 7A:
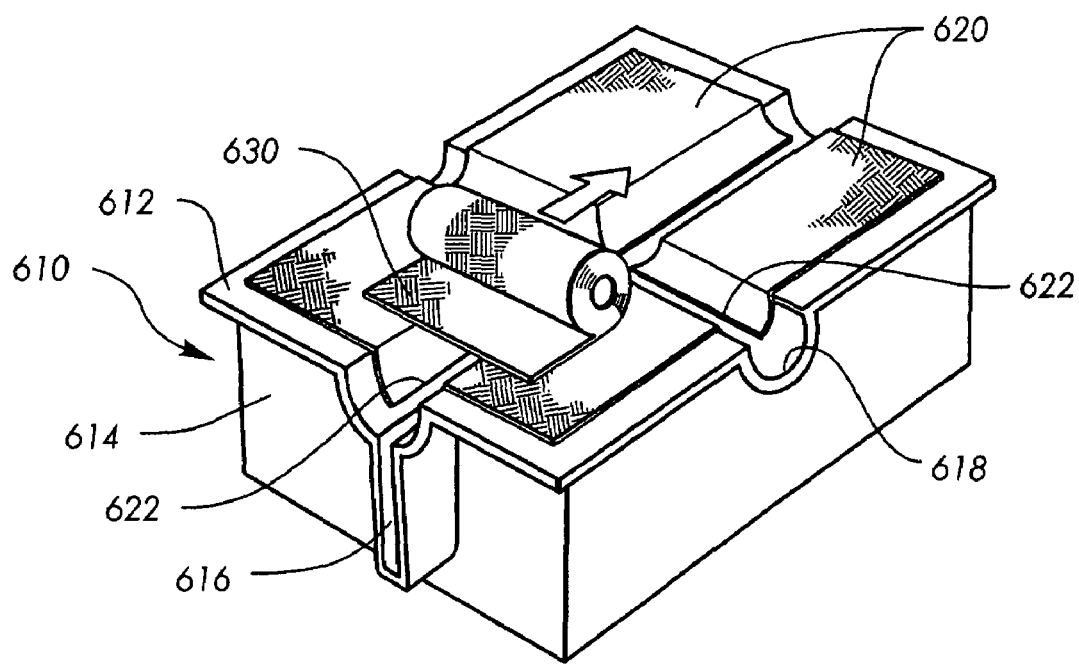
FIGS. 7A-7F are perspective views illustrating the manufacture of another alternative configuration of an interwoven single piece co-cured composite structure.
Figure 7B:
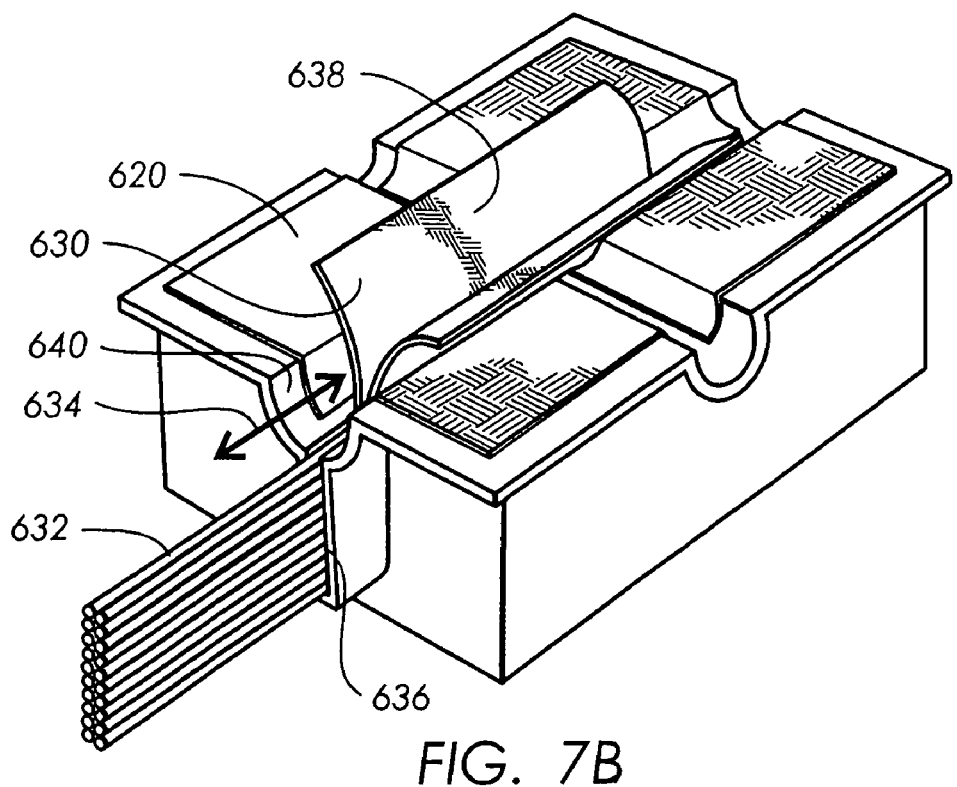
Figure 7C:
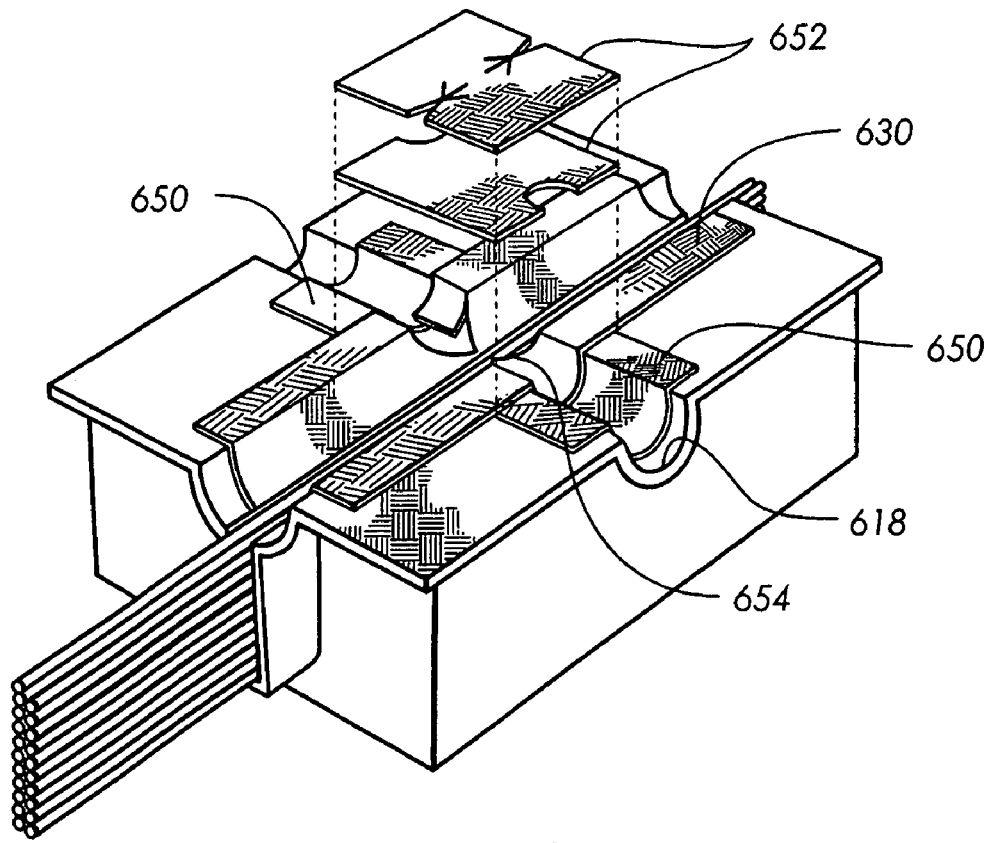
Figure 7D:
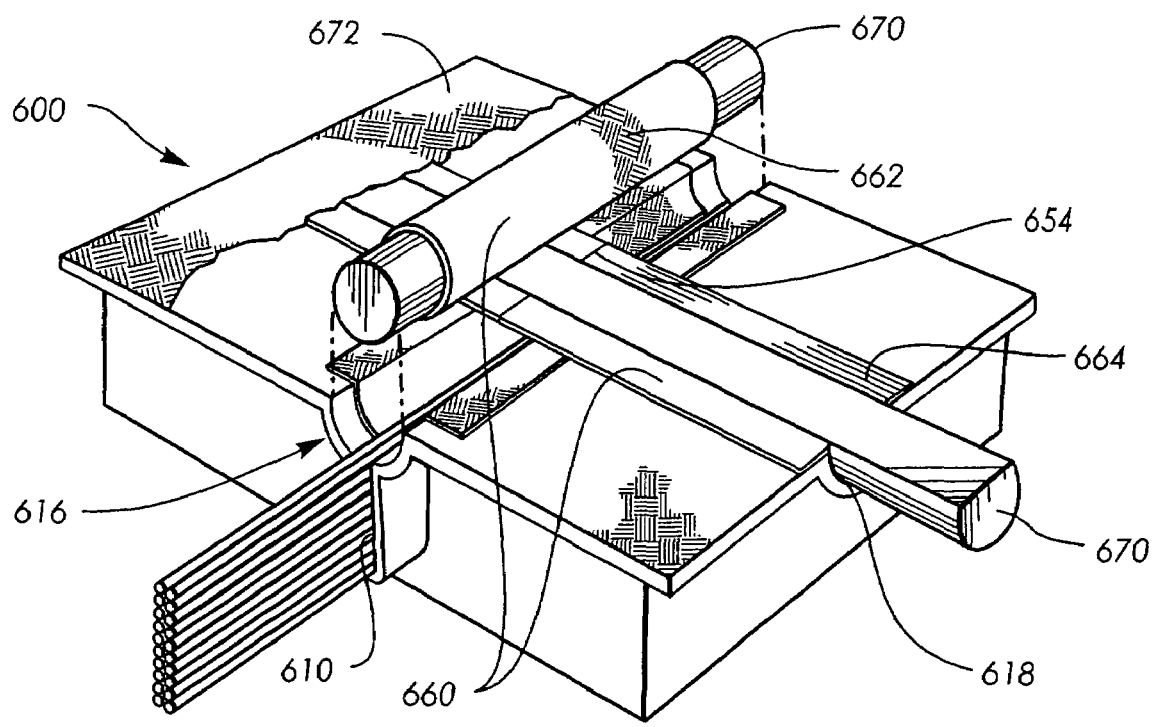
Figure 7E:
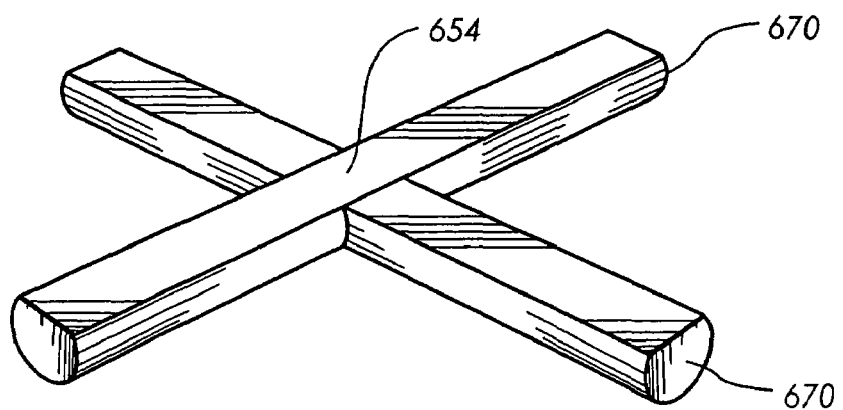
Figure 7F:
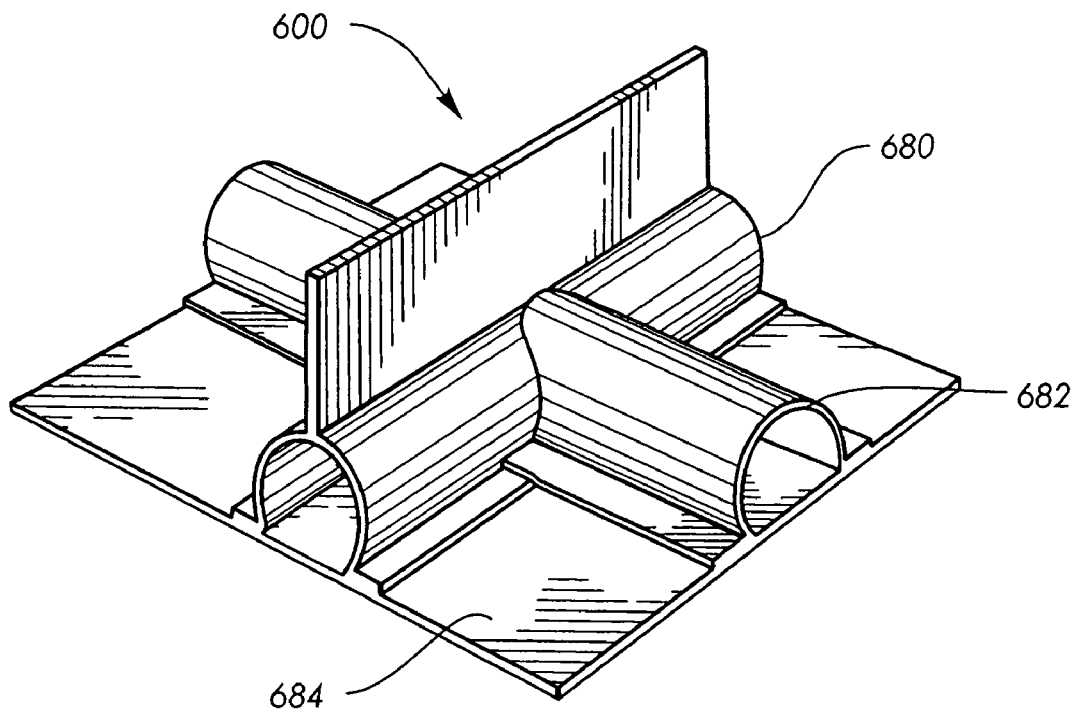

Referring to FIGS. 7A-7F, perspective views illustrate the manufacture of an alternative single piece composite structure 600 shown in FIG. 7F. The method begins by obtaining a mandrel 610 shown in FIG. 7A. The mandrel 610 includes a caul sheet 612 and an extractable substructure 614. The caul sheet 612 includes a frame provision 616 and a stringer provision 618.

An inner skin 620 is formed on the mandrel 610 by filament winding, tape laying or any other method known in the art. The inner skin 620 is cut along the frame provision 616 and the stringer provision 618. The edges 622 of the inner skin 620 formed by the cut are folded into the frame provision 616 and the stringer provision 618.

A frame shear-ply material 630 is centered over the frame provision 616. Alternatively, the frame shear-ply may be centered more to one side of the frame provision 616 than the other. The frame shear-ply material 630 is drawn into the frame provision 616 by a core material 632 as shown in FIG. 7B. The core material 632 may be unidirectional fibers aligned with the length 634 of the frame provision 616. Alternatively, the core material may be a weave of fibers extending at an angle to the length 634 of the frame provision 616.

Core material 632 is added until the core material 632 has filled a slot 636 of the frame provision 616. The frame shear-ply material 630 that extends from the slot 636 forms a flange 638. The flange 638 follows the surface 640 of the frame provision 616 up from the slot 636 and is folded over onto the inner skin 620.

The frame shear-ply material 630 is then cut along the stringer provision 618 and folded into the stringer provision 618 as shown in FIG. 7C. Stringer shear-ply material 650 maybe placed on both sides of the frame shear-ply material 630 along the stringer provision 618. Intersection pads 652 are also placed over the intersection 654 of the frame provision 616 and the stringer provision 618 in order to reinforce the intersection 654. Intersection pads 652 are not necessary, but may improve the performance of the intersection 654.

Structural sheets 660 may be applied as shown in FIG. 7D to the frame provision 616 and the stringer provision 618. The structural sheets 660 may be layered and cut at the intersection 654 to interweave the structural sheets 660 in the frame provision 616 and the stringer provision 618 together. The structural sheets 660 are layers of composite material that may have fibers 662 that are aligned with or at an angle to the frame provision 616 and the stringer provision 618. The structural sheets 660 may also be composed of unidirectional fibers 664 aligned with either the frame provision 616 or the stringer provision 618.

To maintain the position of the structural material 660 during the curing process, insert tools such as tube mandrels 670 are placed in the frame provision 616 and the stringer provision 618. As shown in FIG. 7E, the tube mandrels 670 flatten as required at the intersections 654. An outer skin 672 is formed over the mandrel 610 and the tube mandrels 670 as shown in FIG. 7D. Once the outer skin 672 is completed, the single piece composite structure 600 is complete and ready to be co-cured.

The tube mandrels 670 are inflatable structures that are inflated during the curing process to support the composite material in a desired configuration. Once the single piece composite structure 600 has cured, the tube mandrels 670 may be deflated and withdrawn from the frame 680 and stringer 682 shown in FIG. 7F.

As shown in FIG. 7F, the frame 680 of the single piece co-cured composite structure 600 has a Y-shaped cross sectional shape that includes a hollow cross section. Additionally, the stringer 682 also has a hollow cross section. The hollow cross section of the frame 680 and stringer 682 saves material while increasing the stiffness of the single piece co-cured composite structure 600. Additionally, the interweaving of the frame 680 and stringer 682 increases the ability to spread a load between the frame 680 and the stringer 682. Furthermore, the frame 680 and stringer 682 are interwoven with the frame increasing the overall strength of the structure with minimal increases in weight.

Figure 8:
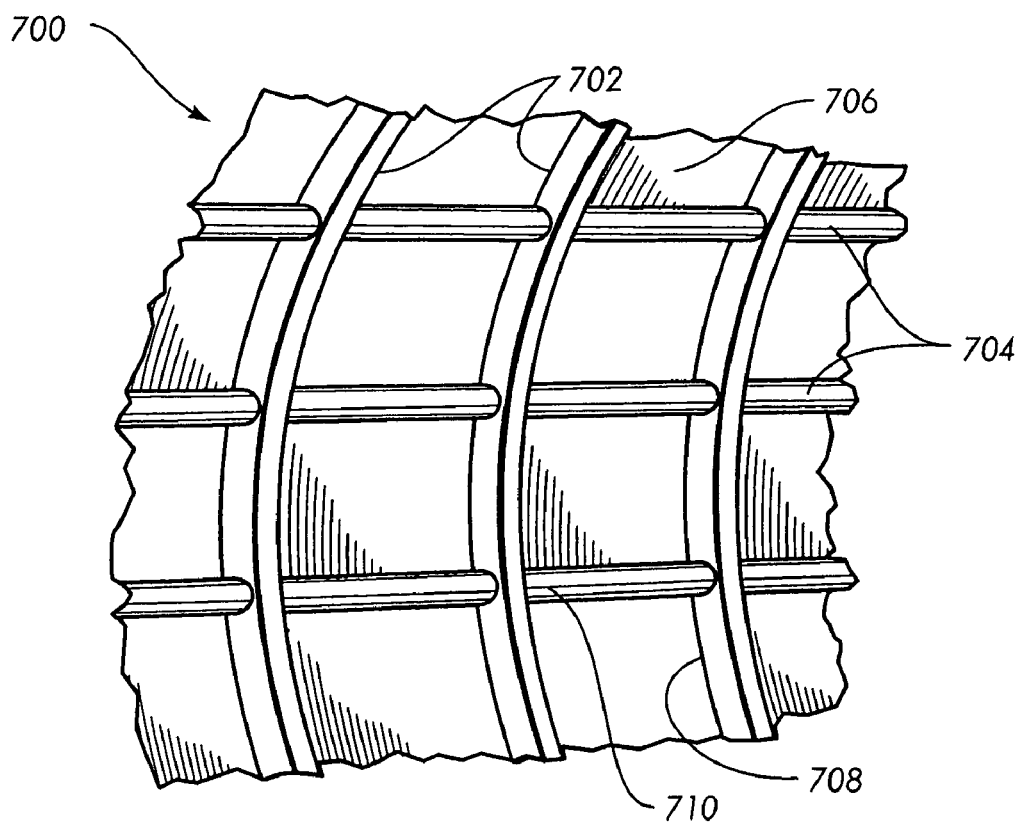
FIG. 8 is a perspective view illustrating an interwoven single piece co-cured composite structure having a plurality of frames and stringers interwoven with the skin of the interwoven single piece co-cured composite structure.

Referring to FIG. 8, a perspective view illustrates a single piece co-cured composite structure 700 manufactured according to the methods disclosed above that includes a plurality of frames 702 and a plurality of stringers 704. The plurality of frames 702 and the plurality of stringers 704 may have any cross sectional shape such as a J-shaped cross sectional shape, Y-shaped cross sectional shape, C-shaped cross sectional shape, a T-shaped cross sectional shape, an I-shaped cross sectional shape, a Ω-shaped cross sectional shape, a hollow cross sectional shape, a bead cross sectional shape, or any other cross sectional shape known in the art.

Additionally, each frame 702 is interwoven with each of the stringers 704 and each stringer 704 is interwoven with each of the frames 702. Furthermore, the plurality of frames 702 and a plurality of stringers 704 are interwoven with the skin 706. Interweaving the plurality of frames 702 and a plurality of stringers 704 with the skin 706 may increase the strength of the skin/frame interface 708 and the skin/stringer interface 710 as much as three times the strength of resin or adhesively bonded skin/frame interfaces and the skin/stringer interfaces. Additionally, the whole structure 700 is co-cured as a single piece. In application, an entire fuselage or other structure may be manufactured as a single co-cured composite structure.

Figure 9A:
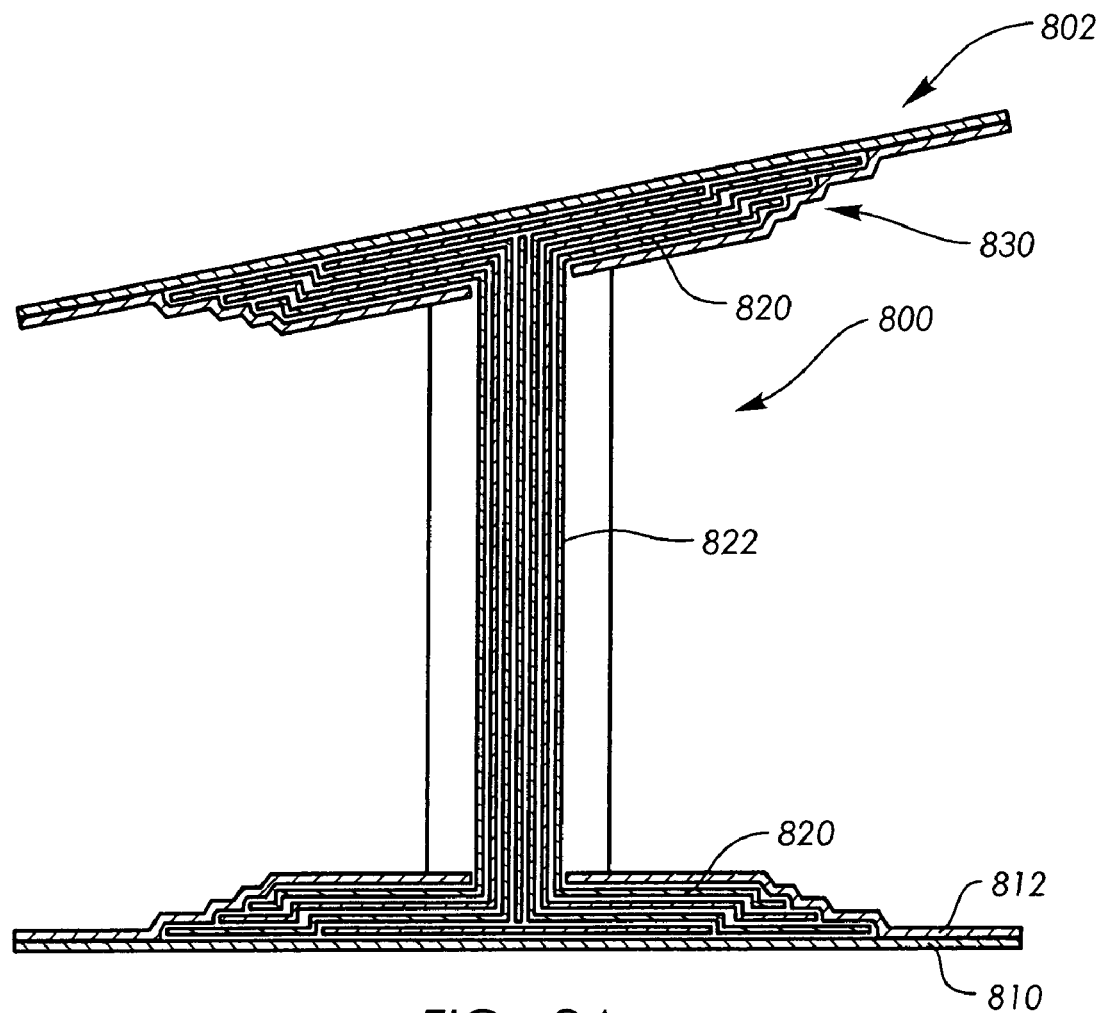
FIGS. 9A-9C are cross sectional views of different configurations of a spar shown in FIG. 1 that is interwoven with the skin of the wing.
Figure 9B:
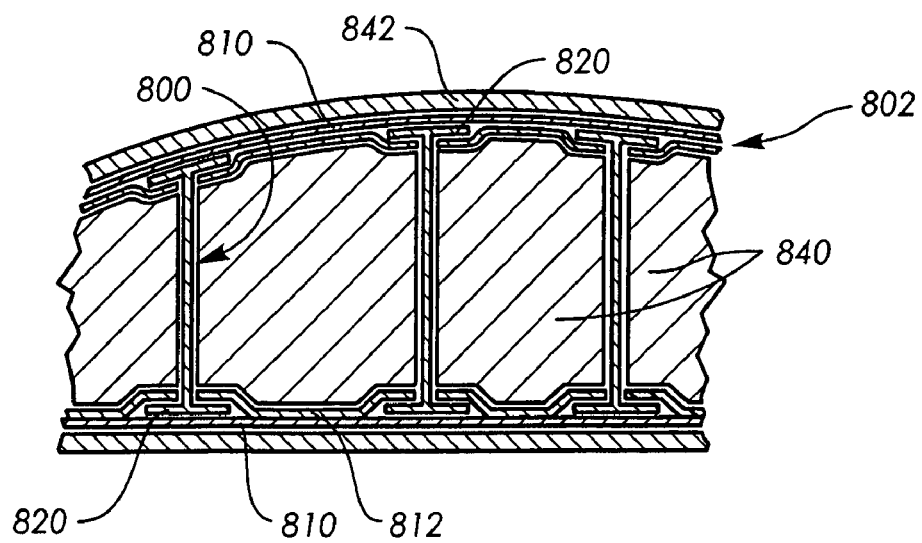
Figure 9C:
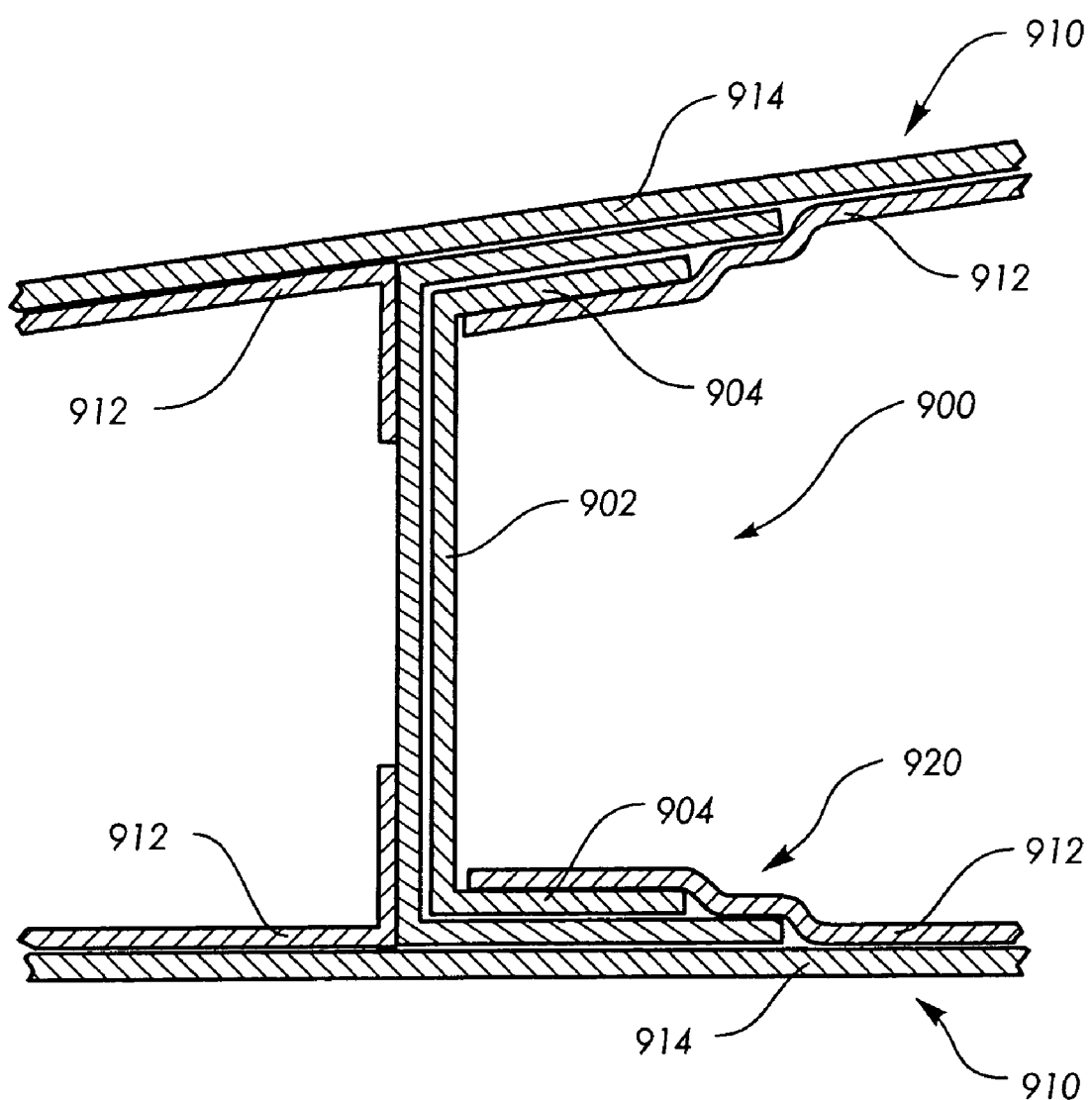

Referring to FIGS. 9A-9C, cross-section views illustrate alternative configurations of wave-shaped spar 116a of FIG. 1. In the configuration of FIG. 9A, the spar 800 has an I-shaped cross sectional shape that is interwoven with the skin 802 according to the methods disclosed above. The skin 802 includes an outer skin 810 and an inner skin 812.

The spar 800 includes a spar cap 820 on both sides of a webbing 822. The spar caps 820 extend generally parallel to the outer skin. Additionally, the spar caps 820 are interwoven with the skin 802 and extend between the outer skin 810 and the inner skin 812. The inner skin 812 may also partially extend onto the webbing 822 of the spar 800 to better secure the spar to the flying surface or skin 802. This interweaving of the spar caps 820 with the skin 802 provides the spar/skin interface 830 up to three times the strength of a spar attached to the skin by resin or adhesives only.

FIG. 9B illustrates the assembly of the spars 800 interwoven with the skin 802. The spars 800 may be assembled by the methods discussed above. Mandrels 840 support the inner skin 812 against the outer skin 810 and the spar caps 820. A clam shell mandrel 842 helps to form the outer skin 810 into a flying surface 850.

FIG. 9C illustrates another alternative configuration of wave-shaped spar 116a of FIG. 1. As shown, the spar 900 has a C-shaped cross sectional shape that includes a webbing 902 and spar caps 904. Of course, the cross sectional shapes of the spars and the frames and stringers disclosed above may be interchanged depending on the manufacturing technique employed to create a single piece composite structure and the requirements of the single piece composite structure. The spar 900 is interwoven with the skin 910 that includes an inner skin 912 and an outer skin 914. The spar caps 904 extend between the outer skin 914 and the inner skin 912 to integrate the spar 900 with the skin 910 to form a single piece composite co-cured structure. The webbing 902 extends inward from the outer skin 914 through the inner skin 912. Additionally, the inner skin 912 can partially extend onto the webbing 902 of the spar 900 to further strengthen the spar/skin interface 920.

An advantage of structures formed using these methods is that a structure such as an aircraft frame may be manufactured as a single piece without part boundaries that may act as stress risers. Additionally, the structures made according to the invention avoid the problems associated with fastener and adhesive assembly.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A single piece co-cured composite structure comprising:
    a composite skin, the skin comprising an inner skin and an outer skin;
    a composite frame having a length, the frame comprising a core of fibers, wherein the frame extends inward from the outer skin; and
    a composite stringer having a length, the stringer comprising a core of fibers, wherein the stringer extends inward from the outer skin, wherein the fibers of the core of the frame is interwoven with the fibers of the core of the stringer, wherein the skin, the frame, and the stringer form a single piece co-cured composite structure.

2. The apparatus, as recited in claim 1, wherein the core of the frame comprises unidirectional fibers aligned along the length of the frame.

3. The apparatus, as recited in claim 1, wherein the core of the stringer comprises unidirectional fibers aligned along the length of the stringer.

4. The apparatus, as recited in claim 1, wherein the fibers of the frame and stringer are woven together in successive layers.

5. The apparatus, as recited in claim 1, wherein the frame extends through the inner skin.

6. The apparatus, as recited in claim 1, wherein the stringer extends through the inner skin.

7. The apparatus, as recited in claim 1, wherein the frame comprises a frame base, wherein the frame base is interwoven with the skin.

8. The apparatus, as recited in claim 1, wherein the stringer comprises a stringer base, wherein the stringer base is interwoven with the skin.

9. The apparatus, as recited in claim 1, wherein the frame comprises a frame shear-ply that extends partially around the core of the frame.

10. The apparatus, as recited in claim 9, wherein the frame shear-ply is comprised of fibers orientated about 45° relative to the length of the frame.

11. The apparatus, as recited in claim 1, wherein the stringer comprises a stringer shear-ply that extends partially around the core of the stringer.

12. The apparatus, as recited in claim 11, wherein the stringer shear-ply is comprised of fibers orientated about 45° relative to the length of the stringer.

13. A single piece co-cured composite structure comprising:

a composite skin comprising an inner skin and an outer skin;

a composite frame having fibers, the frame extending inward from the outer skin; and a composite stringer having fibers, the stringer extending inward from the outer skin, wherein the fibers of the stringer are interwoven with the fibers of the frame, wherein the skin, the frame, and the stringer form a single piece co-cured composite structure.

14. The apparatus, as recited in claim 13, wherein the fibers of the frame and the fibers of the stringer are interwoven with the skin.

15. The apparatus, as recited in claim 13, wherein the frame comprises a frame shear-ply, wherein the frame shear-ply is comprised of fibers orientated about 45° relative to the length of the frame.

16. The apparatus, as recited in claim 13, wherein the stringer comprises a stringer shear-ply, wherein the stringer shear-ply is comprised of fibers orientated about 45° relative to the length of the stringer.

17. The apparatus, as recited in claim 13, wherein the frame comprises fibers aligned along the length of the frame.

18. The apparatus, as recited in claim 13, wherein the stringer comprises fibers aligned along the length of the stringer.

19. A method for manufacturing a single piece co-cured structure comprising a skin, a frame, and a stringer, the skin comprising an inner skin and an outer skin, wherein the skin, frame, and stringer are interwoven together, the method comprising:

forming the inner skin of composite material on a mandrel comprising a frame provision and a stringer provision;

cutting the inner skin along the frame provision;

disposing a frame shear-ply of composite material within the frame provision to form the frame, the frame shear-ply covering a portion of the inner skin;

cutting the inner skin along the stringer provision;

disposing a stringer shear-ply of composite material within the stringer provision to form the stringer, the stringer shear-ply covering a portion of the inner skin;

forming the outer skin of composite material over the inner skin, frame shear-ply, and stringer shear-ply;

co-curing the skin, the frame, and the stringer as a single piece composite structure.

20. The method of claim 19, further comprising cutting the frame shear-ply along the stringer provision.

21. The method of claim 19, further comprising cutting the stringer shear-ply along the stringer provision.

22. The method of claim 19, further comprising removing the mandrel.

23. The method of claim 19, further comprising disposing frame core composite material within frame provision so that the frame shear-ply material partially surrounds the frame core composite material.

24. The method of claim 23, wherein the frame core composite material comprises unidirectional fibers aligned with the length of the frame provision.

25. The method of claim 19, further comprising disposing stringer core composite material within stringer provision so that the stringer shear-ply material partially surrounds the stringer core composite material.

26. The method of claim 25, wherein the stringer core composite material comprises unidirectional fibers aligned with the length of the stringer provision.

27. The method of claim 25, wherein frame comprises frame core composite material, the frame core composite material interwoven with the stringer core composite material.

28. The method of claim 19, further comprising disposing an insert tool within the frame provision of the mandrel.

29. The method of claim 28, wherein the insert tool comprises an insert stringer provision to facilitate interweaving the stringer with the frame.

30. The method of claim 28, further comprising disposing an inner support skin on the insert tool to help form the frame.

31. The method of claim 28, further comprising removing the insert tool from the frame provision of the mandrel, once the single piece composite structure has been cured.

32. The method of claim 19, further comprising disposing an insert tool within the stringer provision.

33. The method of claim 32, further comprising removing the insert tool from the stringer provision of the mandrel, once the single piece composite structure has been cured.

34. The method of claim 33, wherein an insert tool is disposed within the frame provision, wherein the insert tool disposed within the frame provision and the insert tool disposed within the stringer provision overlap.

35. The method of claim 19, further comprising disposing intersection pads at an intersection of the frame provision with the stringer provision on the mandrel.

* * * * *